United States Patent
Mishra et al.

(10) Patent No.: US 11,106,620 B1
(45) Date of Patent: Aug. 31, 2021

(54) MIXED SIGNAL DEVICE ADDRESS ASSIGNMENT

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/841,865

(22) Filed: Apr. 7, 2020

(51) Int. Cl.
*G06F 13/42* (2006.01)
*G06F 1/04* (2006.01)

(52) U.S. Cl.
CPC ............ *G06F 13/4291* (2013.01); *G06F 1/04* (2013.01); *G06F 2213/0052* (2013.01)

(58) Field of Classification Search
CPC .... G06F 13/4282; G06F 13/4291; G06F 1/04; G06F 2213/0052
See application file for complete search history.

(56) References Cited

U.S. PATENT DOCUMENTS

| | | | | |
|---|---|---|---|---|
| 8,631,179 B1* | 1/2014 | Faulds | ................... | G06F 13/364 710/110 |
| 2007/0294443 A1* | 12/2007 | Berenbaum | ............. | G06F 13/42 710/104 |
| 2008/0301344 A1* | 12/2008 | Hsieh | .................. | G06F 13/4282 710/110 |
| 2016/0364362 A1* | 12/2016 | Akers | .................. | G06F 13/4291 |
| 2017/0286358 A1* | 10/2017 | Srivastava | .............. | G06F 1/324 |
| 2018/0039598 A1* | 2/2018 | Mishra | ................... | H04L 7/0008 |
| 2018/0150424 A1* | 5/2018 | Miluzzi | ................. | G06F 13/404 |
| 2018/0267916 A1* | 9/2018 | Mishra | ................ | G06F 13/4282 |
| 2020/0159689 A1* | 5/2020 | Koshisaka | .......... | G06F 13/4068 |

* cited by examiner

*Primary Examiner* — Glenn A. Auve
(74) *Attorney, Agent, or Firm* — Qualcomm Incorporated

(57) ABSTRACT

Systems, methods, and apparatus for improving addressability of slave devices coupled to a serial bus are described. A method the slave device includes delaying transitions in a control signal received at an input pin of the slave device, enabling a counter after detecting a delayed first transition in the control signal, where the counter is configured to count pulses on a data line of a serial bus, transmitting a first pulse on the data line of the serial bus after enabling the counter, counting the first pulse and one or more additional pulses on the data line of the serial bus, and using an output of the counter to generate a unique identifier used for communicating over the serial bus. Each of a plurality of slave devices may be configured to transmit one of the additional pulses on the serial bus after the first transition occurs in the control signal.

30 Claims, 16 Drawing Sheets

1500

```
┌─────────────────────┐
│ Address Assignment  │
└─────────────────────┘
           │
           ▼                                    ┌─ 1502
┌───────────────────────────────────────────┐
│ Delay transitions in a control signal     │
│ received at an input pin of the slave     │
│ device                                    │
└───────────────────────────────────────────┘
           │
           ▼                                    ┌─ 1504
┌───────────────────────────────────────────┐
│ Enable a counter after detecting a        │
│ delayed first transition in the control   │
│ signal, wherein the counter is configured │
│ to count pulses on a data line of a       │
│ serial bus                                │
└───────────────────────────────────────────┘
           │
           ▼                                    ┌─ 1506
┌───────────────────────────────────────────┐
│ Transmit a pulse on the data line of the  │
│ serial bus after enabling the counter     │
└───────────────────────────────────────────┘
           │
           ▼                                    ┌─ 1508
┌───────────────────────────────────────────┐
│ Count the first pulse and one or more     │
│ additional pulses on the data line of the │
│ serial bus                                │
└───────────────────────────────────────────┘
           │
           ▼                                    ┌─ 1510
┌───────────────────────────────────────────┐
│ Use an output of the counter to generate  │
│ a unique identifier used for              │
│ communicating over the serial bus,        │
│ wherein each of a plurality of slave      │
│ devices is configured to transmit one of  │
│ the one or more additional pulses on the  │
│ serial bus after the first transition     │
│ occurs in the control signal              │
└───────────────────────────────────────────┘
```

*FIG. 15*

MIXED SIGNAL DEVICE ADDRESS ASSIGNMENT

TECHNICAL FIELD

The present disclosure relates generally to serial communication over a shared serial bus and, more particularly, to improving address assignment procedures in slave devices.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that carry commands and messages used for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. SPMI protocols define a hardware interface that may be implemented between baseband or application processors and peripheral components. In some instances, SPMI protocols are implemented to support power management operations within a device.

In many instances, a multi-drop serial bus may be physically capable of supporting large numbers of devices that implement high-speed, complex applications, but may be hindered by a limited number of addresses and limited ability to assign addresses. The addressing scheme defined by certain standards and protocols governing bus operation may be inadequate to facilitate efficient device operations in some advanced applications.

SUMMARY

Certain aspects of the disclosure relate to systems, apparatus, methods and techniques that can enable slave devices coupled to a serial bus to be dynamically assigned using a mixed signal device address assignment procedure. In one example, a bus master may initiate the address assignment procedure using an out-of-band signal transmitted on a wire or connector that is not involved in data transmission on the serial bus. Each slave device coupled to the serial bus may respond to the out-of-band signal at different times, and a unique identifier may be assigned to each slave device coupled to the serial bus based on the speed of response of the slave device relative to other slave devices coupled to the serial bus.

In various aspects of the disclosure, a method performed at a device coupled to a serial bus includes delaying transitions in a control signal received at an input pin of the slave device, enabling a counter after detecting a delayed first transition in the control signal, where the counter is configured to count pulses on a data line of a serial bus, transmitting a first pulse on the data line of the serial bus after enabling the counter, counting the first pulse and one or more additional pulses on the data line of the serial bus, and using an output of the counter to generate a unique identifier used for communicating over the serial bus. Each of a plurality of slave devices may be configured to transmit one of the one or more additional pulses on the serial bus after the first transition occurs in the control signal.

In various aspects of the disclosure, an apparatus includes an interface circuit adapted to couple the apparatus to a serial bus, one or more control circuits and a processor. The one or more control circuits may be configured to delay transitions in a control signal received at an input pin of the slave device, enable a counter after detecting a delayed first transition in the control signal, where the counter is configured to count pulses on a data line of a serial bus, transmit a first pulse on the data line of the serial bus after enabling the counter, and count the first pulse and one or more additional pulses on the data line of the serial bus. The processor may be configured to use an output of the counter to generate a unique identifier used for communicating over the serial bus. Each of a plurality of slave devices is configured to transmit one of the one or more additional pulses on the serial bus after the first transition occurs in the control signal.

In various aspects of the disclosure, a processor-readable storage medium stores code for delaying transitions in a control signal received at an input pin of the slave device, enabling a counter after detecting a delayed first transition in the control signal, where the counter is configured to count pulses on a data line of a serial bus, transmitting a first pulse on the data line of the serial bus after enabling the counter, counting the first pulse and one or more additional pulses on the data line of the serial bus, and using an output of the counter to generate a unique identifier used for communicating over the serial bus. Each of a plurality of slave devices is configured to transmit one of the one or more additional pulses on the serial bus after the first transition occurs in the control signal.

In various aspects of the disclosure, an apparatus includes means for delaying transitions in a control signal received at an input pin of the slave device, means for counting pulses on the data line of the serial bus, including a counter enabled after delayed first transition in the control signal is detected, means for transmitting pulses on the data line of the serial bus, configured to transmit a first pulse on the data line after enabling the counter, means for generating a unique identifier, where the unique identifier is based on an output of the counter and is used for communicating over the serial bus. Each of a plurality of slave devices is configured to transmit one of the one or more additional pulses on the serial bus after the first transition occurs in the control signal. The means for pulses on the data line of the serial bus may be configured to count additional pulses on the data line of the serial bus after detecting the delayed first transition in the control signal.

Various method, system, device, and apparatus embodiments may also include additional features. For example, each of the plurality of slave devices may be configured to add a different delay to the transitions in the control signal to obtain a version of the delayed first transition. Each of the plurality of slave devices may be configured to count pulses on the data line of the serial bus after detecting a respective version of the delayed first transition. Each of the plurality of slave devices counts a different number of pulses on the data line of the serial bus. Each of the plurality of slave devices may use an output of a corresponding counter to generate a unique identifier used for communicating over the serial bus.

In another example, the input pin of the slave device is coupled to a resistor-capacitor network that is configured to add a delay to the transitions in the control signal. The control signal may be provided by a bus master device or a controller managed by a bus master device.

In another example, a slave device may refrain from transmitting more than one pulse on the data line of the serial bus after detecting the delayed first transition in the control signal. The first pulse may be generated from a clock signal received from the serial bus.

BRIEF DESCRIPTION OF THE DRAWINGS

FIG. 15 is a flowchart that illustrates certain aspects disclosed herein.

DETAILED DESCRIPTION

Figure 1:
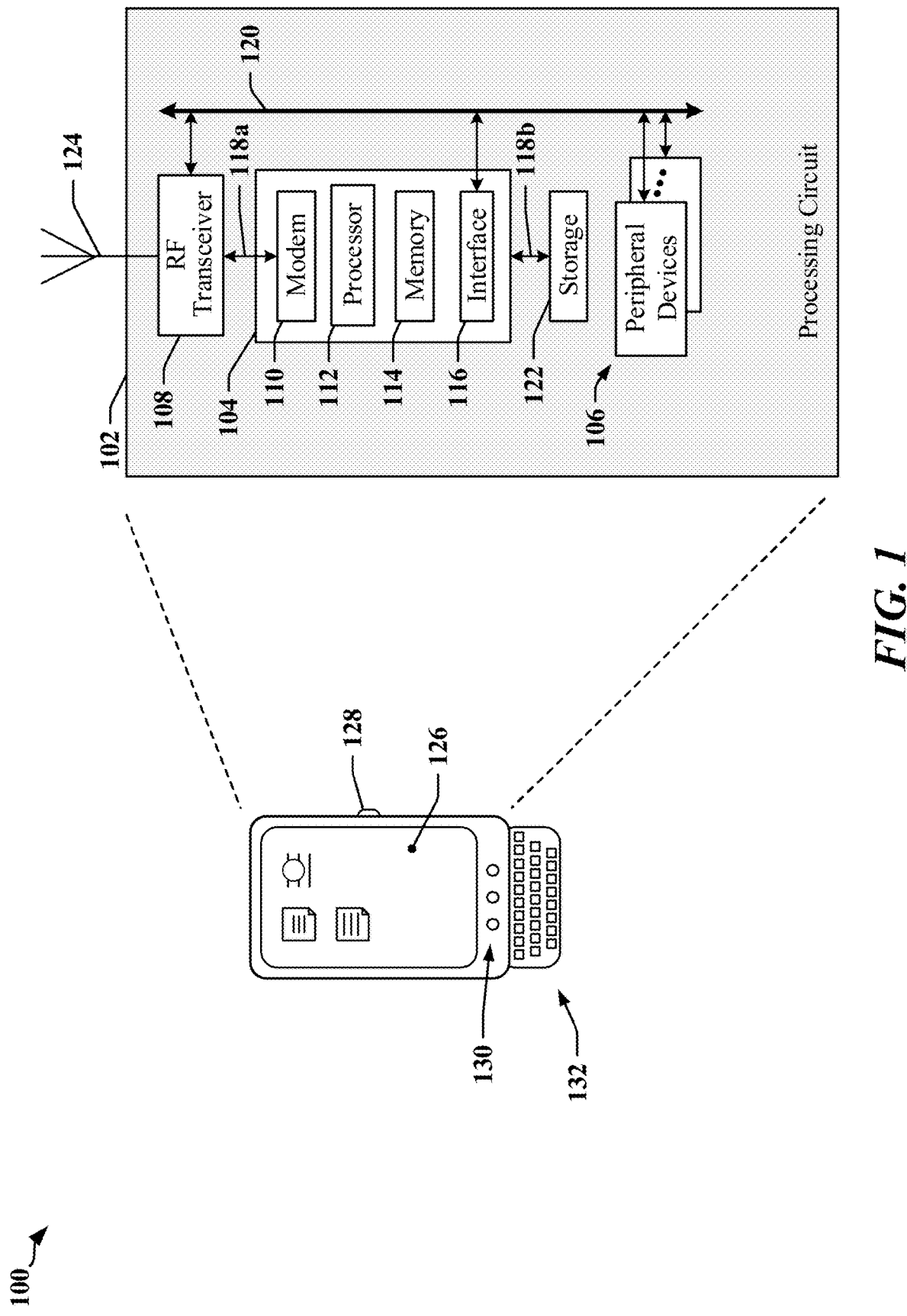
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or another data communication link that is usable to connect processors with modems and other peripherals. The serial bus or other data communication link may be operated in accordance with one or more standards or protocols. For example, the serial bus may be operated in accordance with an I2C, I3C, SPMI, and/or RFFE protocol, or another protocol. In some instance, the serial bus may be configured for half-duplex operation. Increased functionality and complexity of operations involving devices coupled to serial buses, together with the use of greater numbers of peripherals, radio-frequency front-end devices and/or sensors device in support of complex applications can result in a shortages of available unique addresses that can be assigned to slave devices.

Certain aspects of the disclosure relate to the use of a mixed-signal device address assignment procedure that enables slave addresses to be dynamically assigned to devices coupled to a serial bus. A bus master device may initiate an address assignment procedure in multiple slave devices by providing a signaling state transition in a wire or connector coupled to a device select or device identifier pin (ID Pin) of each slave device. The address assignment procedure may include an enumeration procedure that is performed independently of the bus master device at each slave device. In one example, an address assignment procedure initiated in a slave device includes delaying transitions in a control signal received at an input pin of the slave device, and enabling a counter after detecting a delayed first transition in the control signal.

The counter may be used in the enumeration procedure and may be configured to count pulses observed on a data line of a serial bus. Regarding the pulses on the data line, the slave device transmits a pulse on the data line of the serial bus after enabling the counter, and the counter counts this self-generated pulse. The counter counts one or more additional pulses on the data line that have been generated by other slave devices participating in the address assignment procedure after the signaling state transition provided by the bus master device. Each slave device adds a different delay to the signaling state transition, and the slave devices enable their counters at different times. The counters in the slave devices have different output values at the end of the address assignment procedure, since each slave device generates a single pulse on the data line and begins counting after enabling its counter. The counter output values may be used to generate unique slave identifiers that can be used for communicating over the serial bus.

Certain aspects disclosed herein may be applicable to a serial bus operated in accordance with RFFE protocols, SPMI protocols, I3C protocols, I2C protocols, and/or or another bus protocol. Certain aspects are applicable to a serial bus operated in half-duplex mode or full-duplex mode. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules stored in the on-board memory 114 or other processor-readable storage 122 provided on the processing circuit 102. The software modules may include instructions and data. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
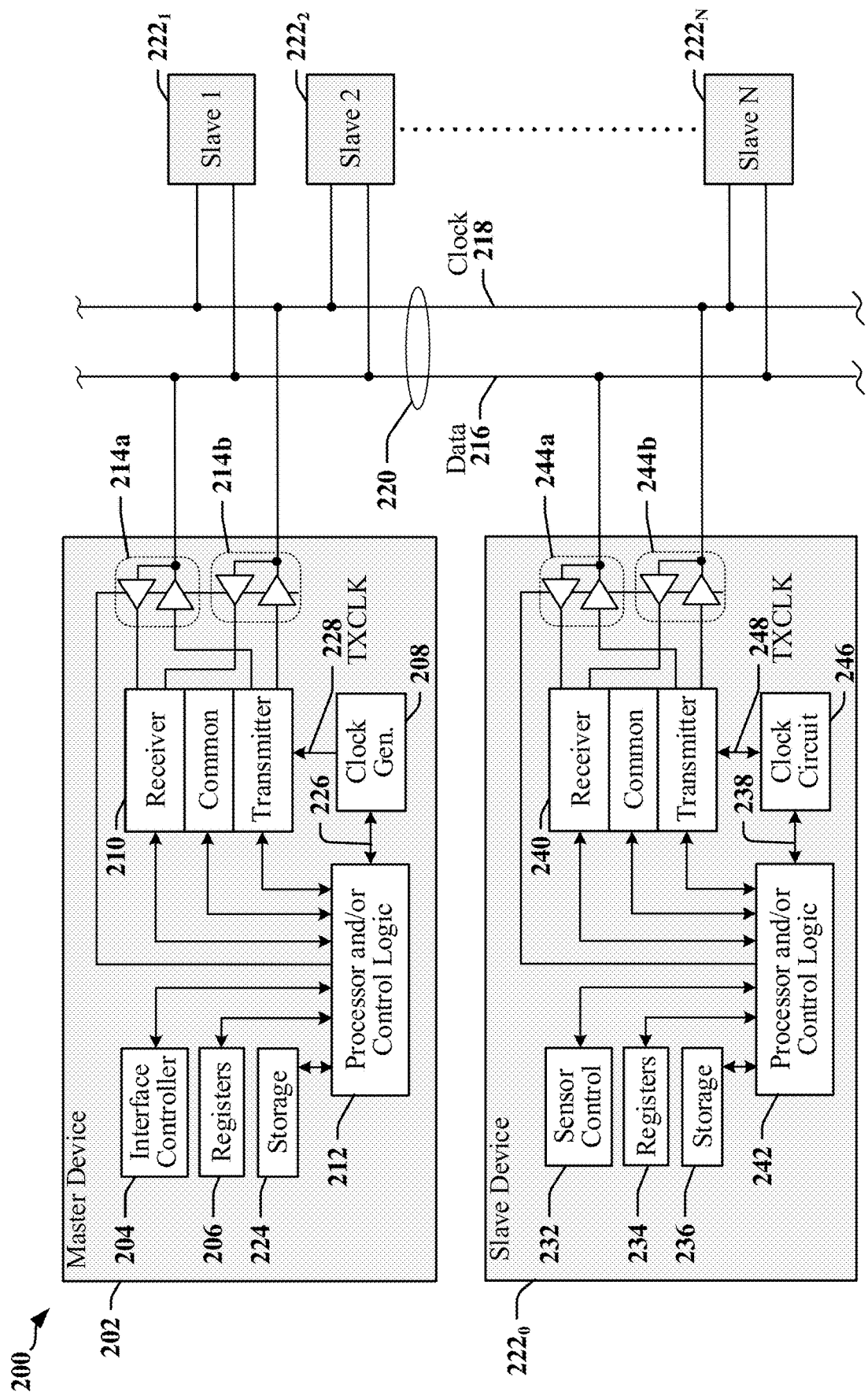
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device.

Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with an I2C protocol, I3C protocol, RFFE protocol, SPMI protocol, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

In some conventional systems, multiple serial buses are provided to support demands for high data throughput, low latency, high bus availability and/or for other reasons. In some instances, multiple serial buses are used to alleviate issues cause by limited addressing capabilities of serial bus protocols. By way of example, FIGS. 3 and 4 illustrate systems in which multiple serial buses may be employed to interconnect master and slave devices.

Figure 3:
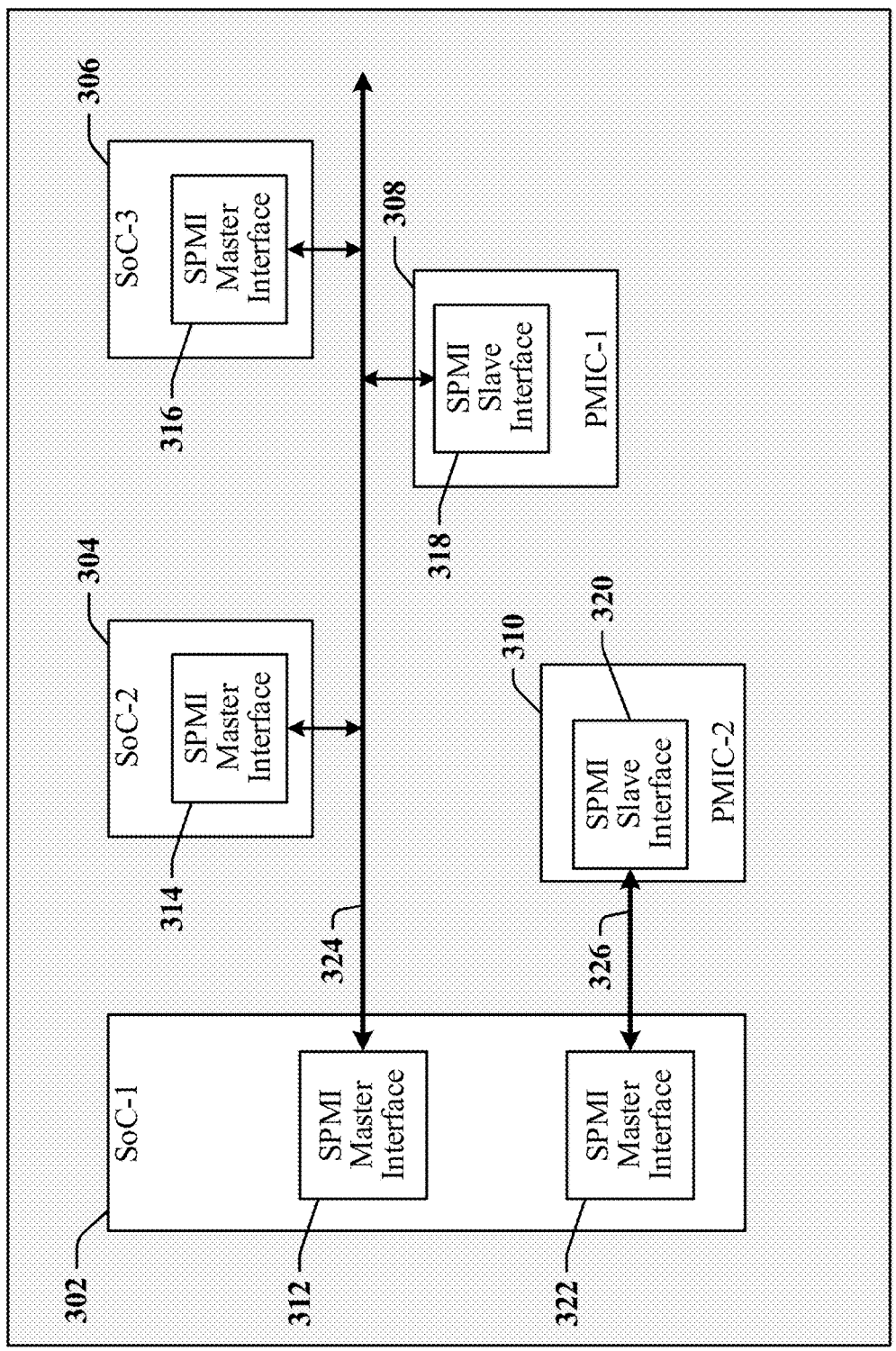
FIG. 3 illustrates a device that employs an SPMI bus to couple various front-end devices in accordance with certain aspects disclosed herein.

FIG. 3 illustrates an example of a system 300 that may have one or more serial buses 324, 326 operated in accordance with I2C, I3C, RFFE, SPMI, and/or another bus protocol. In one example, SPMI protocols may be used to provide a power management control bus that can communicate commands to cause circuits and/or functional components to reset, sleep, shutdown, wakeup, and so on. In some implementations, I2C, I3C, RFFE, SPMI, and/or other bus protocols may be used to implement a general-purpose communication link. In the illustrated example, a two-wire serial bus 324, 326 may connect multiple slave devices (e.g., the PMICs 308, 310) to one or more devices (e.g. SoCs 302, 304, 306) that can be configured to serve as a master device. In the example of a serial bus controlled in accordance with an SPMI protocol, between one and four master devices may be coupled to the serial bus 324, 326 and up to 16 slave devices may be supported. The serial bus 324, 326 includes a first wire (SCLK) that carries a clock signal and a second wire that carries a data signal (SDATA). Certain bus protocols, including SPMI protocols, support bus contention arbitration, request arbitration and group addressing to permit the PMICs 308, 310 to be written concurrently or simultaneously by a master device (SoCs 302, 304, 306). In some implementations, a bus protocol can support a low-speed mode that operates with a clock frequency of between 32 kHz and 15 MHz, and a high-speed mode that operates with a clock frequency of between 32 kHz and 26 MHz. Slave devices coupled to a serial bus may be required to acknowledge certain commands.

In the illustrated example, the system 300 includes three SoCs 302, 304, 306 and two power management integrated circuits (PMICs 308, 310). Other types of peripheral devices may be coupled to a serial bus 324, 326 that is operated in accordance with an SPMI protocol, or another protocol. In the illustrated system 300, a first serial bus 324 couples a bus master 312, 314, 316 on each SoC 302, 304, 306 and a bus slave 318 on a first PMIC 308, and a second serial bus 326 couples a bus slave 320 in a second PMIC 310 to an additional bus master 322 provided in one SoC 302.

Figure 4:
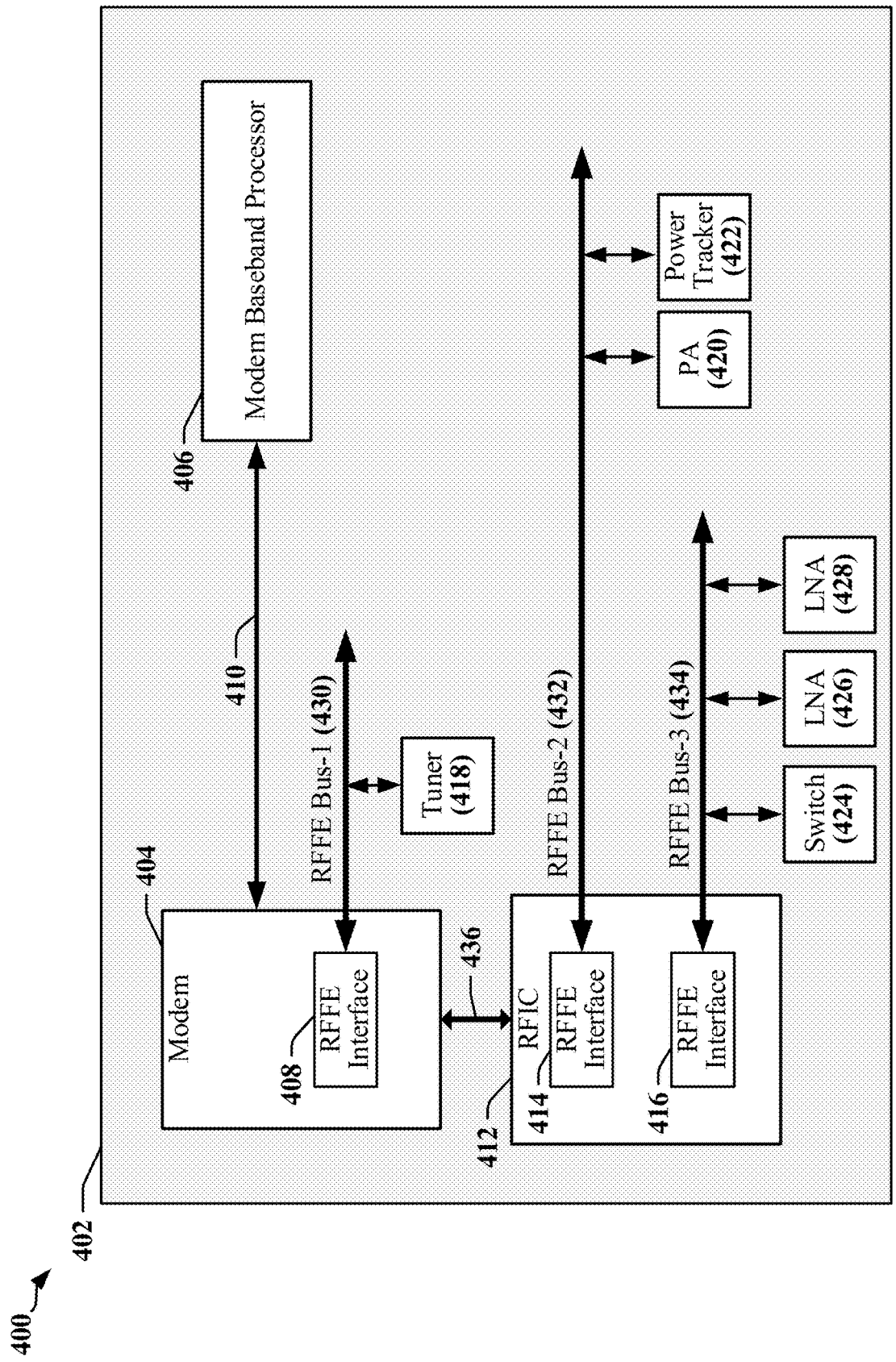
FIG. 4 illustrates a device configuration for coupling various radio frequency front-end devices using multiple RFFE buses in accordance with certain aspects disclosed herein.

FIG. 4 is a diagram 400 illustrating an example of a chipset or device 402 that employs multiple RFFE buses 430, 432, 434 used to couple various RF front-end devices 418, 420, 422, 424, 426, 428. In this example, a modem 404 includes an RFFE interface 408 that couples the modem 404 to a first RFFE bus 430. The modem 404 may communicate with a baseband processor 406 and a Radio-Frequency IC (RFIC 412) through respective communication links 410, 436 or, in some implementations, through a common communication link 410 or 436. The illustrated device 402 may be embodied in a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 402 may be implemented with one or more baseband processors 406, modems 404, RFICs 412, multiple communication links 410, 436, multiple RFFE buses 430, 432, 434 and/or other types of buses. The device 402 may include other processors, circuits, modules and may be configured for various operations and/or different functionalities. In the example illustrated in FIG. 4, the modem 404 is coupled to an RF tuner 418 through its RFFE interface 408 and the first RFFE bus 430. The RFIC 412 may include one or more RFFE interfaces 414, 416, controllers, state machines and/or processors that configure and control certain aspects of the RF front-end. In the illustrated example, the RFIC 412 communicates with a PA 420 and a power tracking module 422 through a first of its RFFE interfaces 414 and the second RFFE bus 432. In the illustrated example, the RFIC 412 communicates with a switch 424 and one or more LNAs 426, 428 through a second of its RFFE interfaces 416 and the third RFFE bus 434.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In one example, latency-sensitive messages include coexistence messages. Coexistence management (CxM) messages are transmitted in a multisystem platform to prevent or reduce instances of certain types of RFFE device impinging on each other. RFFE devices that may be the source or subject of CxM messages include, for example, switches 424, LNAs 426, 428, PAs 420 and other types of device that operate concurrently in a manner that generates inter-device RF interference, and/or that could potentially cause damage to one or more devices. CxM messages may be exchanged between certain devices that are shared between different radio access technologies, wireless subscriptions and/or applications. For example, a switch 424, LNA 426, 428, PA 420 and/or an antenna may be shared by two different radio access technologies which have different transmit and receive schedules, and damage to an LNA 426, 428 or other device may occur if a device begins transmitting using one radio access technology while receiving using another radio access technology. Devices that can interfere with one another may exchange CxM messages to permit each device to signal imminent actions that may result in interference or conflict. For example, two modems 404 may exchange CxM messages in order to manage the operation of shared components. In conventional systems CxM messages may be exchanged using dedicated serial links, each implemented using a two-wire or four-wire Universal Asynchronous Receiver/Transmitter (UART). In multi-radio, multi-application systems, the CxM interconnects and other device interconnects can consume large numbers of physical input/output (I/O) pins and interconnects adding to cost and routing complexity.

Certain aspects disclosed herein relate to mixed signal device address assignment procedures and techniques that enable slave devices coupled to a serial bus to be dynamically and/or automatically assigned unique identifiers. In one example, a bus master may initiate the address assignment procedure using an out-of-band signal transmitted on a wire or connector that is not involved in data transmission on the serial bus. Each slave device coupled to the serial bus may respond to the out-of-band signal at different times, and a unique identifier may be assigned to each slave device coupled to the serial bus based on the speed of response of the slave device relative to other slave devices coupled to the serial bus. The circuits, techniques and procedures disclosed herein may be applicable to serial buses operated in accordance with various protocols, including RFFE, SPMI and I3C protocols, among others. The ability to address devices efficiently and/or the ability to expand addressing capabilities can reduce the number of serial buses needed to support devices and can reduce the number physical I/O pins needed to support communication between multiple devices.

Certain aspects of this disclosure relate to datagram structures and other structures defined by serial bus protocols and addressed to devices coupled to a serial bus. Datagram structures may be defined for transmission of command, control and data payloads within application-defined latency tolerances. Datagram structures for different protocols define certain common features, including address fields that carry device addresses used to select devices for transactions that receive or transmit data, or for management functions, interrupt processing, etc. The device addresses may indicate device priorities. In this disclosure, the example of RFFE and SPMI protocols may be employed to illustrate certain aspects disclosed herein. However, the concepts disclosed herein are applicable to other serial bus protocols and standards. Some similarities exist between RFFE and SPMI datagram structures, and the concepts disclosed herein are applicable to other protocols where different datagram structures may be defined.

Figure 5:
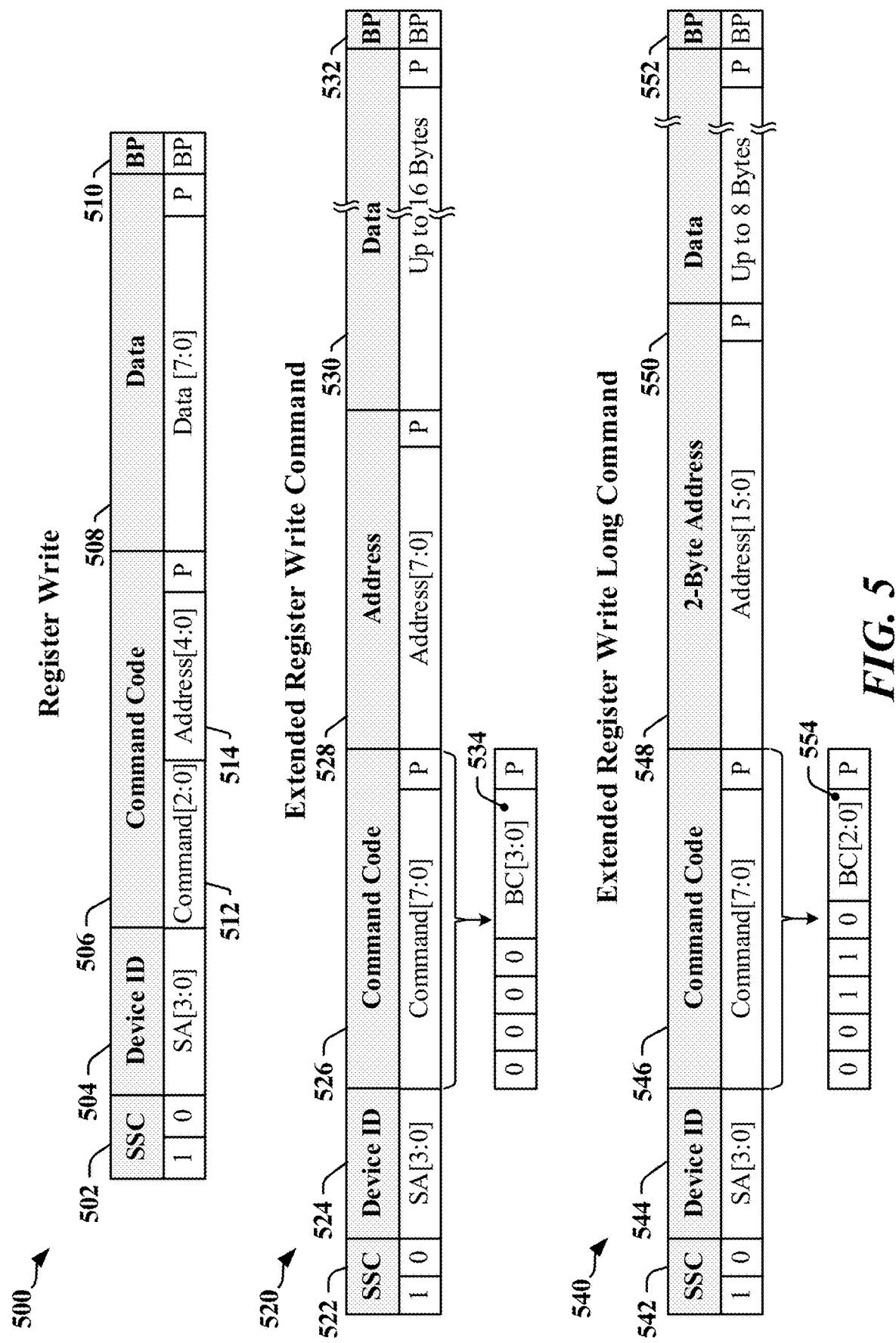
FIG. 5 illustrates datagram structures defined by RFFE protocols.

FIG. 5 illustrates datagram structures for a Register Write (RW) command 500, an Extended Register Write (ERW) command 520 and an extended register write long (ERWL) command 540. The datagram structures are defined by RFFE protocols, and can be used to efficiently write data to registers within the addressable register address range of a slave device. The RW command 500, the ERW command 520 and the ERWL command 540 each commences with transmission of a two-bit sequence start condition (SSC 502, 522, 542) followed by a four-bit device ID 504, 524, 544. The 4-bit device ID 504, 524, 544 provides for 16 slave addresses, of which one slave address is reserved as a broadcast address, limiting direct addressing capability of the bus master device to 15 devices.

A nine-bit command field 506, 526, 546 is transmitted next. In the RW command 500, the nine-bit command field 506 includes a three-bit command code 512, a five-bit address field 514 and a parity bit. In the ERW command 520, the nine-bit command field 526 is occupied by an eight-bit command code and a parity bit and followed by an address field 528 that carries an eight-bit register address and a parity bit. In the ERWL command 540, the nine-bit command field 546 is occupied by an eight-bit command code and a parity bit and followed by an address field 548 that carries a sixteen-bit register address and a parity bit. In the RW command 500, a data field 508 carries a single data byte. In the ERW command 520, the data field 530 carries up to 16 data bytes. In the ERWL command 540, the data field 530 carries up to 8 data bytes. Each data byte is transmitted with a parity bit. Bus park signaling 510, 532, 552 terminates the command 500, 520, 540.

Address Range in Serial Buses

Conventional RFFE and SPMI protocols support a four-bit device address. Accordingly, 16 addresses are available to be used for a broadcast address, unique slave identifiers (USIDs) and group slave identifiers (GSIDs). In some implementations, one or more addresses may be reserved by protocol, including address 0b0000 which is reserved for use as a broadcast address in certain protocols. The remaining 15 slave addresses in the range {0b0001-0b1111} permit a maximum of 15 slave devices to be active on a serial bus operated in accordance with RFFE and SPMI protocols. Advances in technology and increased complexity of apparatus, including mobile communications apparatus, may result in a demand for larger numbers of slave devices to be controlled by an application processor, modem or controller. In one example, growth in RF front-end complexity in 5G and later radio access technologies may result in a need or desire to support more than 15 devices on a single RFFE bus. In another example, certain applications may wish to assign multiple USIDs to one or more slave devices. In another example, one or more of the available addresses may be allocated for use as GSIDs that enable an application processor, modem or controller to write concurrently to multiple slave devices. In these and other examples, demand for addresses can exceed availability even though the serial bus is capable of supporting significantly greater loads than the load of 15 slave devices.

Figure 6:
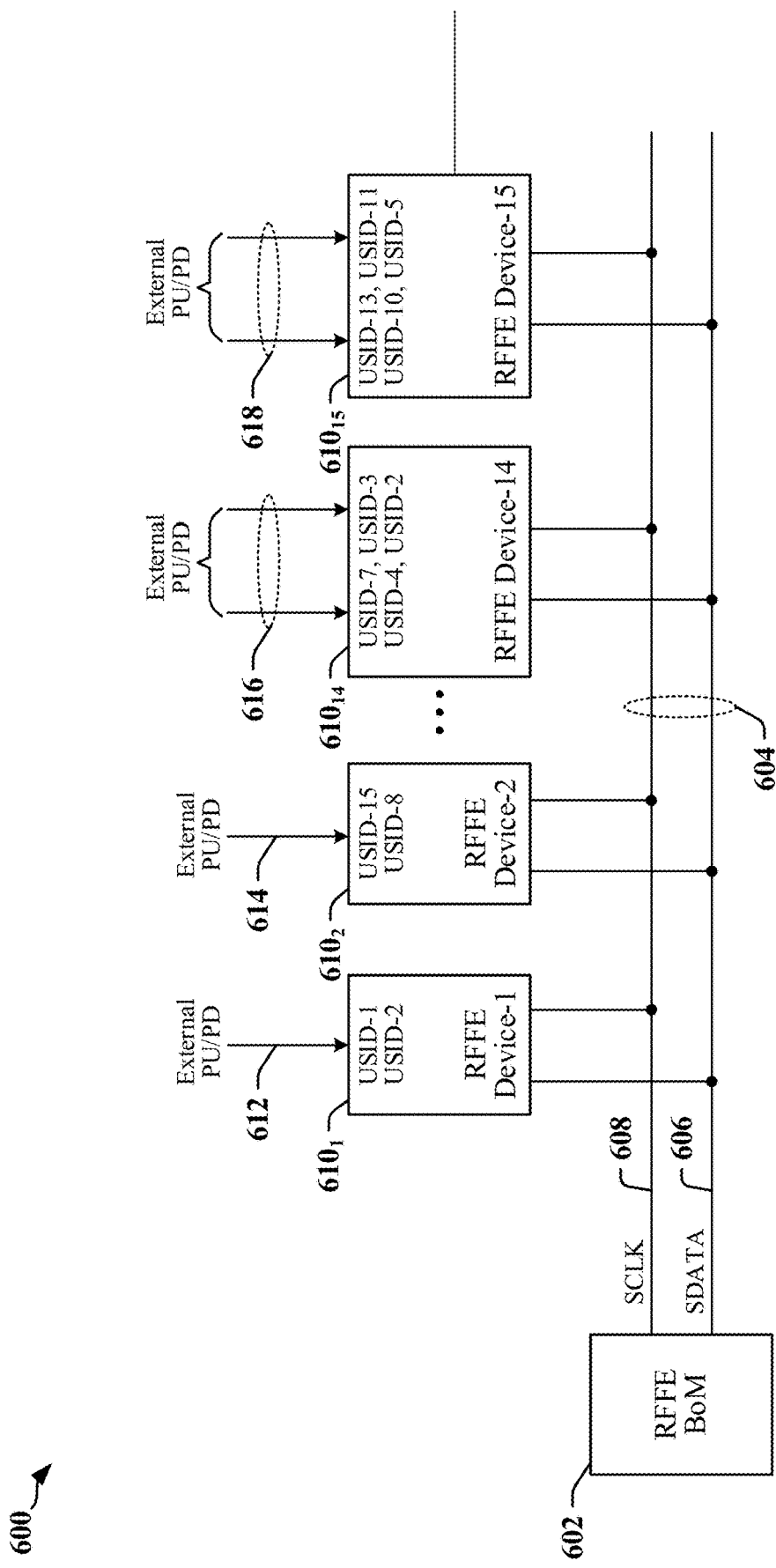
FIG. 6 illustrates a serial bus coupled to slave devices that have identifier pins.

In some serial bus implementations, additional addresses may be provided through the use of external signaling. FIG. 6 illustrates an apparatus 600 that includes a serial bus 604 that is operated in accordance with RFFE protocols. Operation of the serial bus 604 is controlled by a bus owner/master (BoM) and includes an SDATA line 606 which carries data encoded in accordance with a clock signal carried on the SCLK line 608. The RFFE protocols define a 4-bit address, of which one address is used as a broadcast address. In the illustrated example, the remaining 15 addresses are can be assigned to up to 15 slave devices $610_1$-$610_{15}$. The BoM can initiate transactions with a single slave device $610_1$-$610_{15}$ by using an assigned slave address to select the target of a read or write command. More than 15 addresses can be used when external address signals 612, 614, 616, 618 are provided by the bus master.

In the illustrated example, two slave devices $610_1$, $610_2$ each has an identifier-selection input (e.g. an ID Pin) that receives a single external address signal 612, 614 and two slave devices $610_{14}$, $610_{15}$ receive at least two external address signals 616, 618. A first external address signal 612 enables a first slave device $610_1$ to respond to two addresses, a second external address signal 614 enables a second slave device $610_2$ to respond to two addresses, a first pair of external address signals 616 enables a third slave device $610_{14}$ to respond to four addresses, and a second pair of external address signals 618 enables a fourth slave device $610_{15}$ to respond to four addresses. The first external address signal 612 and the second external address signal 614 may be the same or different, and the first pair of external address signals 616 and the second pair of external address signals 618 may be identical or different. One or more of the external address signals 612, 614 may be included in the first pair of external address signals 616 and/or the second pair of external address signals 618. In the illustrated example, a GSID (USID-2) is assigned to the first slave device $610_1$ and to the third slave device $610_{14}$.

The provision of ID Pins on the RFFE slave devices $610_1$-$610_{15}$ may mitigate address conflicts and can offer some flexibility in device address assignment, but ID Pins do not increase the maximum number of slave devices that can be individually or uniquely addressed on the serial bus. The number of addresses provided by protocol remains limited, and the addressing problem is not entirely resolved. Furthermore, most slave devices are limited to a single ID Pin, and address expansion is accordingly limited.

In one example, any available, valid slave address can be allocated to the USID pool for a RFFE slave device $610_1$-$610_{15}$. In the illustrated example, the addresses 0b0001 to 0b1111 are valid. Slave addresses are typically selected, assigned and/or allocated to RFFE slave device $610_1$-$610_{15}$ during system design, and the combination of assigned slave addresses and ID Pins can be used to select between slave devices. For example, an antenna tuner may be assigned two slave addresses in its USID pool during manufacture or assembly, and the ID pins of two antenna tuners coupled to the same RFFE bus may be controlled to enable a bus master device to select between the two antenna tuners, using both allocated USIDs. The bus can support a maximum of two antenna tuners when a single ID pin is provided on each antenna tuner.

In some conventional devices, slave devices may include electronic fuses (eFuses) that can be used to define or modify a default slave identifier configured for the slave device. An eFuse may be a connector that can be blown under the control of software or firmware, and/or by the intervention of an external controller. When blown, the connection made by the eFuse is lost. In one example, an eFuse may be provided in a coupling of a pull-up or pull-down circuit that causes a node in a circuit to assume a first voltage state when the eFuse is intact, and a second voltage state when the eFuse is blown. The use of eFuses can enable default slave identifiers to be configured during manufacture or system integration. Two or more slave devices of the same type (such as antenna tuners) may be assigned different identifiers that permits a bus master device to select between multiple copies of the slave devices. Certain aspects disclosed herein can eliminate the need and associated cost of the use of eFuse technology.

Certain aspects of this disclosure relate to techniques that enable additional, addressable slave devices to be connected to a single serial bus, and that can compensate for a reduction in the number of available addresses when one or more GSIDs are assigned. In one aspect, a single ID pin may be used to implement an address allocation scheme. In another aspect, the address allocation scheme can eliminate the requirement for slave devices to have preassigned USIDs. In another aspect, the address allocation scheme enables USIDs to be assigned during initialization and permits multiple devices of the same type to be coupled to the serial bus. In another aspect, the address allocation scheme can enable the deployment of RFFE or SPMI buses that can enable more physical slave devices to be active on the serial bus than the number of slave addresses supported by the addressing scheme defined by protocol.

According to certain aspects of this disclosure, a mixed-signaling approach enables the address allocation scheme to be implemented in systems where slave devices are equipped with a single ID pin. While certain examples described herein relate to RFFE protocols, the disclosed concepts are applicable to various protocols, including SPMI protocols, for example.

Extending Slave Addresses

Certain aspects of this disclosure relate to an address allocation procedure using a single ID pin on a slave device. The address allocation technique is applicable to a serial bus operated in accordance with an RFFE, SPMI, I3C, and other protocols. The address allocation procedure can alleviate impediments and restrictions associated with fixed and/or predefined slave addresses.

Figure 7:
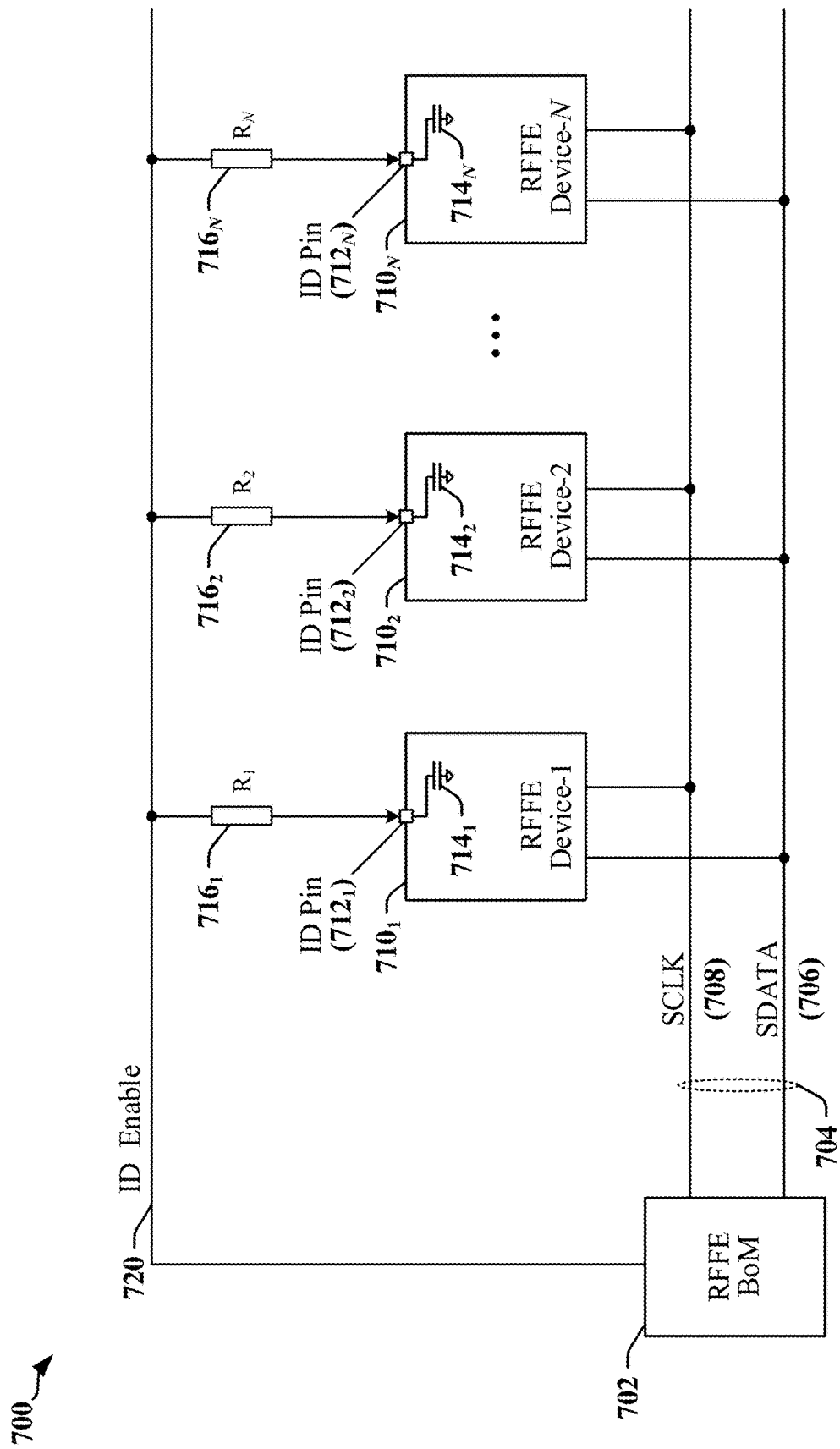
FIG. 7 illustrates a first example of the use of RC circuits coupled to identifier pins in a mixed-signaling address allocation procedure provided in accordance with certain aspects disclosed herein.

FIG. 7 illustrates a system 700 in which ID Pins $714_1$-$714_N$ provided on slave devices $710_1$-$710_N$ may be used in a mixed-signaling address allocation procedure. A bus owner/master (BoM 702) manages operation of a serial bus 704 used to couple the BoM 702 to a number (N) slave devices $710_1$-$710_N$. More than 15 slave devices $710_1$-$710_N$ can be coupled to the serial bus 704 and may participate in the address allocation procedure.

The illustrated example and the descriptions thereof relate to a serial bus 704 that is operated in accordance with RFFE protocols. The serial bus address allocation technique may be adapted for use when another protocol is used to manage operation of the serial bus 704.

The BoM 702 and each of the slave devices $710_1$-$710_N$ is coupled to SDATA 706 and SCLK 708 of the serial bus 704. The BoM 702 also drives an additional connector, wire or line (ID enable line 720) used to control the address allocation procedure. The ID pin $714_1$-$714_N$ on each of the slave devices $710_1$-$710_N$ is coupled to the ID enable line 720 through an RC circuit that includes a resistor $716_1$-$716_N$ and capacitor $712_1$-$712_N$. In the illustrated example, a capacitor $712_1$-$712_N$ provided within each slave device $710_1$-$710_N$ is coupled to the ID pin $714_1$-$714_N$ of the corresponding slave device $710_1$-$710_N$. The ID pin $714_1$-$714_N$ of each of the slave devices $710_1$-$710_N$ is coupled to the ID enable line 720 through a corresponding resistor $716_1$-$716_N$. In some instances, each of the capacitors $712_1$-$712_N$ has the same nominal value. The capacitors $712_1$-$712_N$ may be provided as dedicated physical components added to, or fabricated within the slave devices $710_1$-$710_N$. In some implementations, the capacitors $712_1$-$712_N$ may represent an aggregate of capacitances, including parasitic capacitances associated with the input pins and receiving circuits in the slave devices $710_1$-$710_N$.

Figure 8:
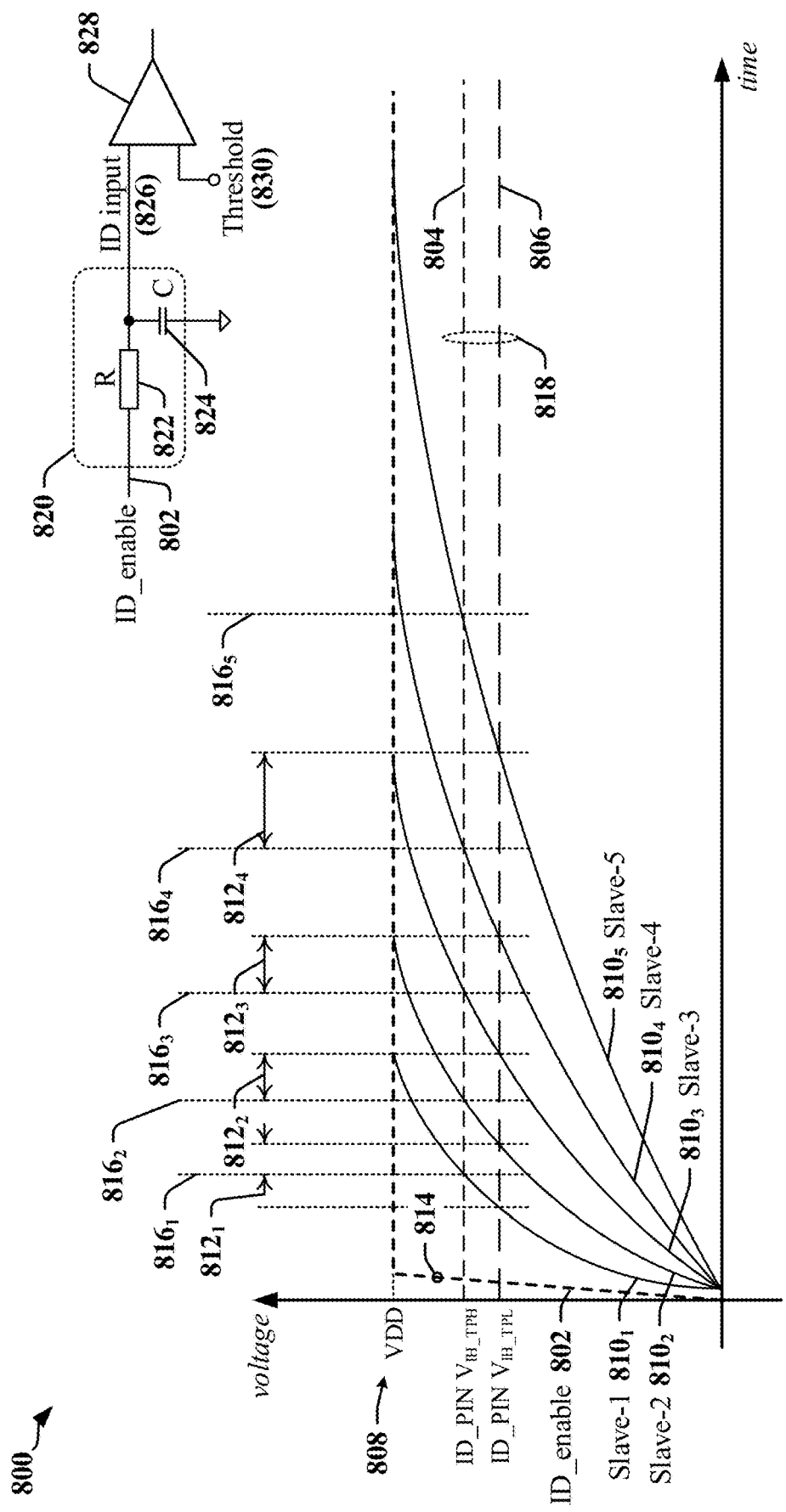
FIG. 8 is a timing diagram that illustrates delays in transitions in a mixed-signaling address allocation procedure provided in accordance with certain aspects disclosed herein.

According to certain aspects of this disclosure, the resistance of the external resistors $716_1$-$716_N$ may be selected to delay the propagation of edges on the ID enable line 720 to the ID pins $714_1$-$714_N$ by different durations of time. The resistance of the external resistors $716_1$-$716_N$ may be selected to cause the devices $710_1$-$710_N$ to detect the edge in the ID enable line 720 at different times. In some implementations, a delay line or other such circuit may provide multiple versions of the ID enable line 720 with different delays. In the illustrated example, each of the slave devices $710_1$-$710_N$ is coupled to the ID enable line 720 through an RC circuit that presents a unique RC-value at the ID pins $714_1$-$714_N$. The RC-values determine the point in time at which each slave device $710_1$-$710_N$ detects a transition and/or edge on the ID enable line 720. FIG. 8 is a timing diagram 800 that illustrates the effect of the use of different RC circuits with RC-values coupled to the ID pins $714_1$-$714_N$ of the slave devices $710_1$-$710_N$.

The timing diagram 800 illustrates the response signals $810_1$-$810_5$ observed at the ID pins of 5 slave devices. Each slave device is coupled to the ID enable line 720 through an RC circuit 820 that includes a resistor 822 and a capacitor 824. The RC circuit 820 receives an ID enable signal 802 that includes an edge 814 corresponding to a transition from a low voltage level to a high voltage level. In one example, the low voltage level may be 0 volts and the high voltage level may be the VDD level 808 of an integrated circuit device. The output 826 of the RC circuit 820 may be provided to a digital receiver 828 in the slave device that switches when the output 826 of the RC circuit 820 crosses a threshold voltage level 830. The switching point of the digital receiver 828 and/or the threshold voltage level 830 may change based on variations in process, voltage and temperature (PVT). In the illustrated example, the digital receiver 828 may be expected to switch when the voltage of the output 826 of the RC circuit 820 is somewhere within voltages ranging between a maximum threshold voltage 804 and a minimum threshold voltage 806 that define the limits of the threshold voltage level 830 for all expected PVT conditions.

The values of the resistor 822 and/or the capacitor 824 may be selected to cause each of the digital receiver 828 in multiple slave devices to detect the edge 814 at different times $816_1$-$816_5$. The values of the resistor 822 and capacitor 824 for each slave device may be selected to ensure that sufficient guard-bands $812_1$-$812_4$ are provided to ensure that after detecting the edge 814, each slave device processes the edge 814 before any other slave device detects and processes the edge 814.

The response signal $810_1$ used by the first slave device to detect the edge 814 transitions through the band of voltages 818 defined by the maximum threshold voltage 804 and the minimum threshold voltage 806 before the response signal $810_2$ used by the second slave device has transitioned into the band of voltages 818. The RC values used for the first and second slave devices may be selected to provide a first guard-band $812_1$ that ensures that the first slave device has completed processing of the edge detection before the response signal $810_2$ transitions into the band of voltages 818.

The response signal $810_2$ transitions through the band of voltages 818 before the response signal $810_3$ used by the third slave device has transitioned into the band of voltages 818. The RC values used for the second and third slave devices may be selected to provide a second guard-band $812_2$ that ensures that the second slave device has completed processing of the edge detection before the response signal $810_3$ transitions into the band of voltages 818.

The response signal $810_3$ transitions through the band of voltages 818 before the response signal $810_4$ used by the fourth slave device has transitioned into the band of voltages 818. The RC values used for the third and fourth slave devices may be selected to provide a third guard-band $812_3$ that ensures that the third slave device has completed processing of the edge detection before the response signal $810_4$ transitions into the band of voltages 818.

The response signal $810_4$ transitions through the band of voltages 818 before the response signal $810_5$ used by the fifth slave device has transitioned into the band of voltages 818. The RC values used for the fourth and fifth slave devices may be selected to provide a fourth guard-band $812_4$ that ensures that the fourth slave device has completed processing of the edge detection before the response signal $810_5$ transitions into the band of voltages 818.

The guard-bands $812_1$-$812_4$ operate to maintaining a minimum difference between the response times of multiple slave devices. The RC-values used in each RC circuit 820 may be determined as a function of the frequency of the clock signal transmitted on the SCLK line of the serial bus. An address allocation procedure may transition between states at edges of the clock signal. In one example, the guard-bands $812_1$-$812_4$ may be provided to ensure that a minimum number of clock cycles occurs between detections of edges by different slave devices during the USID assignment process.

The ID enable signal 802 may be directly driven by the BoM, or may be driven by another device under the messaging control of the BoM. In one example, the ID enable signal 802 may be driven by a PMIC 308, 310 (see FIG. 3), including during an address allocation procedure. In some implementations, hysteresis may be provided on the input to the digital receiver 828 to improve immunity to noise and increase the effectiveness of the guard-bands $812_1$-$812_4$.

Other variations are contemplated. For example, both the resistor 822 and capacitor 824 of the RC circuit 820 may be provided within a slave device, either the resistor 822 or the capacitor 824 of the RC circuit 820 may be provided externally, or both the resistor 822 and capacitor 824 of the RC circuit 820 may be provided externally.

Figure 9:
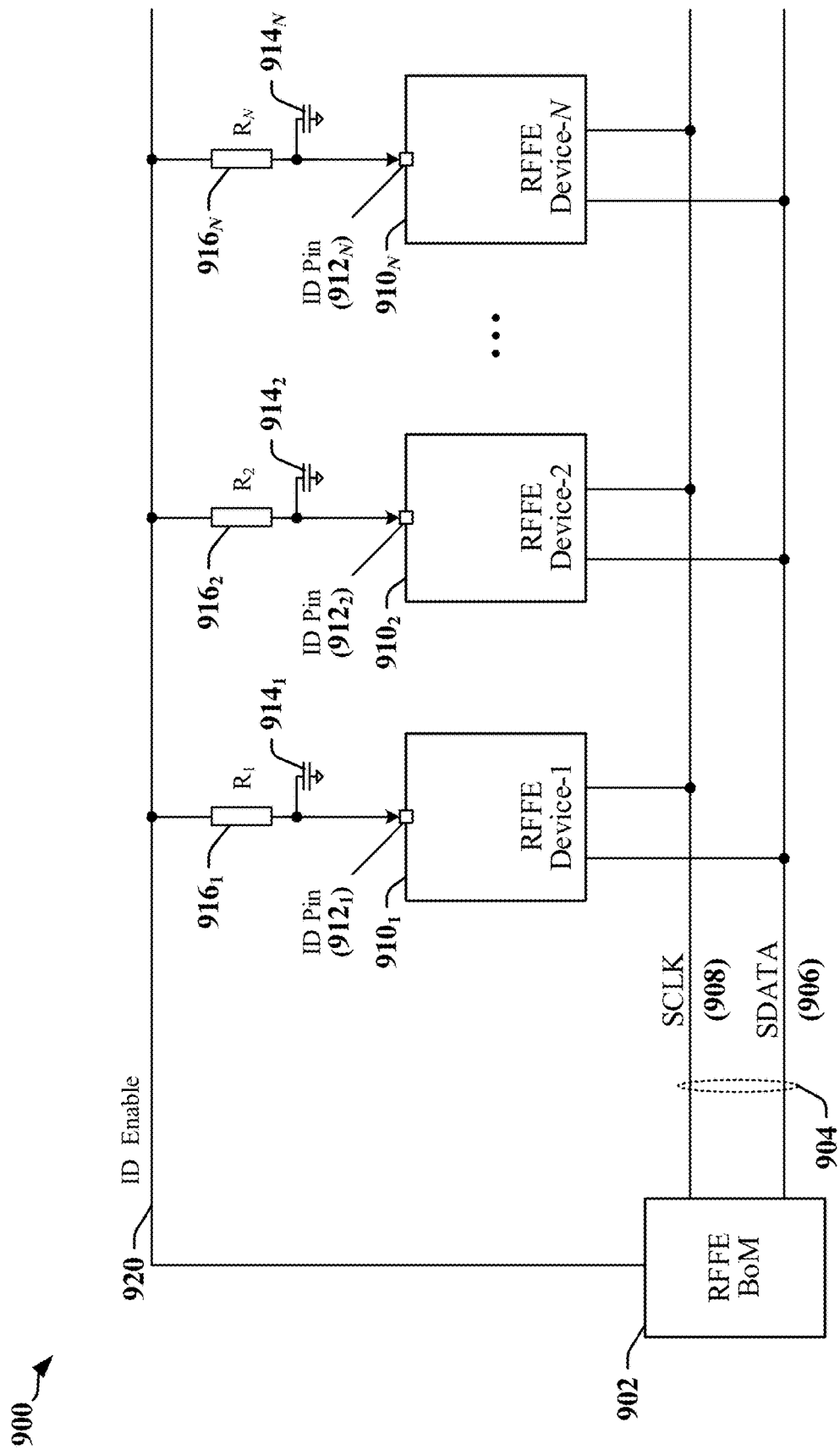
FIG. 9 illustrates a second example of the use of RC circuits coupled to identifier pins in a mixed-signaling address allocation procedure provided in accordance with certain aspects disclosed herein.

FIG. 9 illustrates a system 900 in which external resistors $916_1$-$916_N$ and external capacitors $914_1$-$914_N$ are coupled to the ID pin $912_1$-$912_N$ on slave devices $910_1$-$910_N$ and used in a mixed-signaling address allocation procedure. A bus owner/master (BoM 902) manages operation of a serial bus 904 used to couple the BoM 902 to a number (N) slave devices $910_1$-$910_N$. More than 15 slave devices $910_1$-$910_N$ can be coupled to the serial bus 904 and may participate in the address allocation procedure. The illustrated example and the descriptions thereof relate to a serial bus 904 that is operated in accordance with RFFE protocols. The serial bus address allocation technique may be adapted for use when another protocol is used to manage operation of the serial bus 904.

The BoM 902 and each of the slave devices $910_1$-$910_N$ is coupled to SDATA 906 and SCLK 908 of the serial bus 904. The BoM 902 also drives an additional connector, wire or line (ID enable line 920) used to control the address allocation procedure. Each of the slave devices $910_1$-$910_N$ is coupled to the ID enable line 920 through an RC circuit that includes an external resistor $916_1$-$916_N$ and external capacitor $914_1$-$914_N$. In the illustrated example, an external capacitor $914_1$-$914_N$ is coupled to the ID pin $912_1$-$912_N$ of one of the slave devices $910_1$-$910_N$. The ID pin $912_1$-$912_N$ of each of the slave devices $910_1$-$910_N$ is coupled to the ID enable line 920 through a corresponding external resistor $916_1$-$916_N$.

According to certain aspects of this disclosure, the resistance of the external resistors $916_1$-$916_N$ and/or the capacitance of the external capacitors $914_1$-$914_N$ may be selected to delay the propagation of edges on the ID enable line 920 to the ID pins $912_1$-$912_N$ by different durations of time. The resistance of the external resistors $916_1$-$916_N$ and/or the capacitance of the external capacitors $914_1$-$914_N$ may be selected to cause the devices $910_1$-$910_N$ to detect the edge in the ID enable line 920 after different delays. In some implementations, a delay line or other such circuit may provide multiple versions of the ID enable line 920 with different delays.

In the example illustrated in FIG. 9, each of the slave devices $910_1$-$910_N$ is coupled to the ID enable line 920 through an RC circuit that presents a unique RC-value at the ID pins $912_1$-$912_N$. The RC-values determine the point in time at which each slave device $910_1$-$910_N$ detects a transition and/or edge on the ID enable line 920.

The use of delayed detections of edges, as illustrated in FIG. 8 and/or the provision of selectable response delays supports certain address allocation procedures provided in accordance with certain aspects of this disclosure. For example, the use of the RC circuit 820 enables an address-assignment procedure that is stateful and sensitive to the response behavior of slave devices. Slave devices may be provided with a circuit that automatically assigns a unique identifier to slave devices using address allocation procedures executed in accordance with certain aspects of this disclosure.

Figure 10:
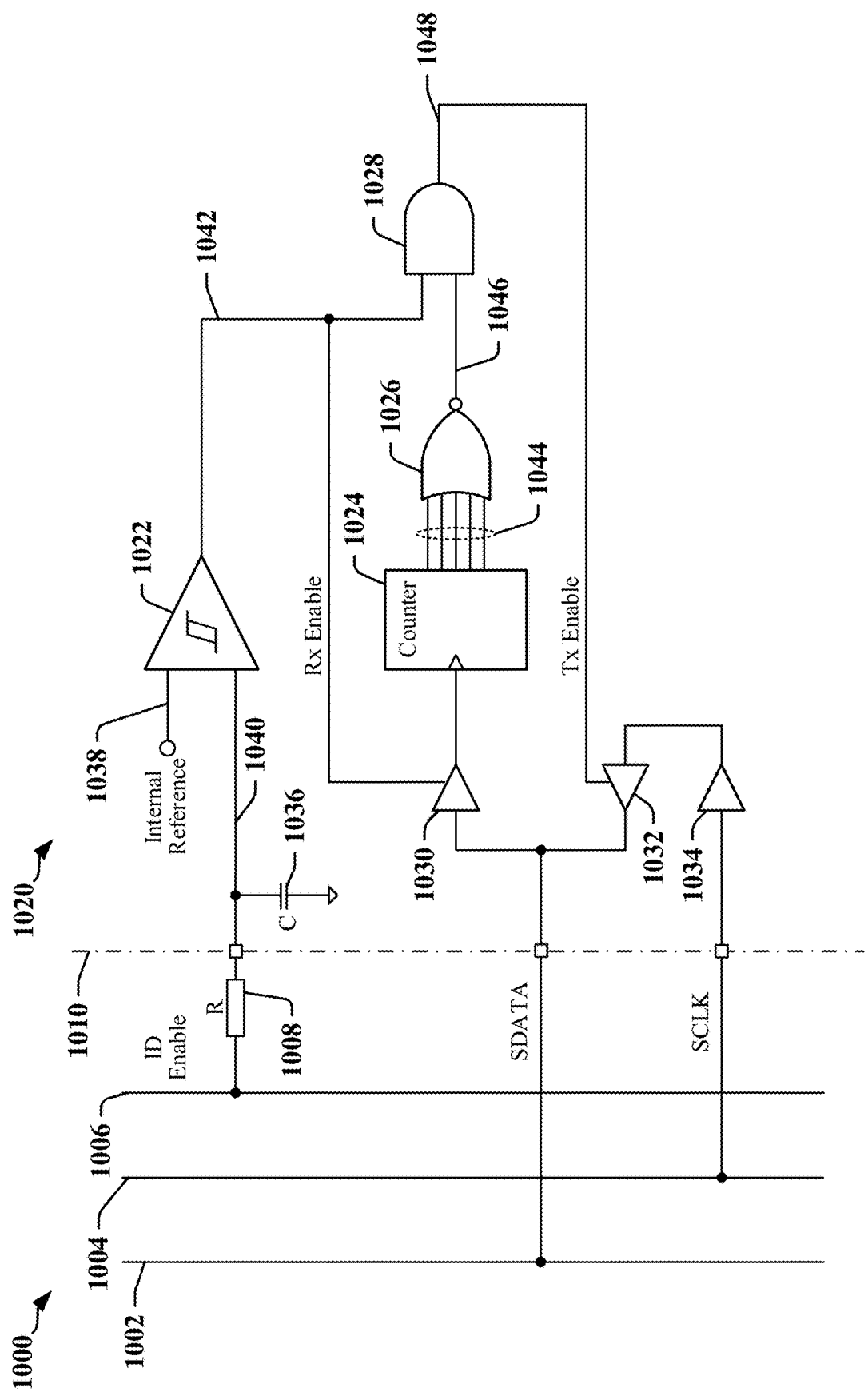
FIG. 10 illustrates an address allocation circuit in a slave device provided in accordance with certain aspects disclosed herein.

FIG. 10 illustrates an address allocation circuit 1020 provided at the edge 1010 of a slave device coupled to a serial bus 1000. The serial bus 1000 may be operated in accordance with an RFFE protocol, an SPMI protocol or another serial bus protocol. The serial bus 1000 includes an SDATA line 1002 and an SCLK line 1004. A signal transmitted on an ID enable line 1006 may be used to initiate an address allocation procedure. The SDATA line 1002 and an SCLK line 1004 are used in the address allocation procedure. Each slave device participating in the address allocation procedure provides a pulse on the SDATA line 1002 and configures its unique identifier based on the number of pulses it observes on the SDATA line 1002, including the pulse it generated. The BoM may count pulses on the SDATA line 1002, and may terminate the address allocation procedure when each slave device that was expected to participate has provided a pulse on the SDATA line 1002.

Figure 11:
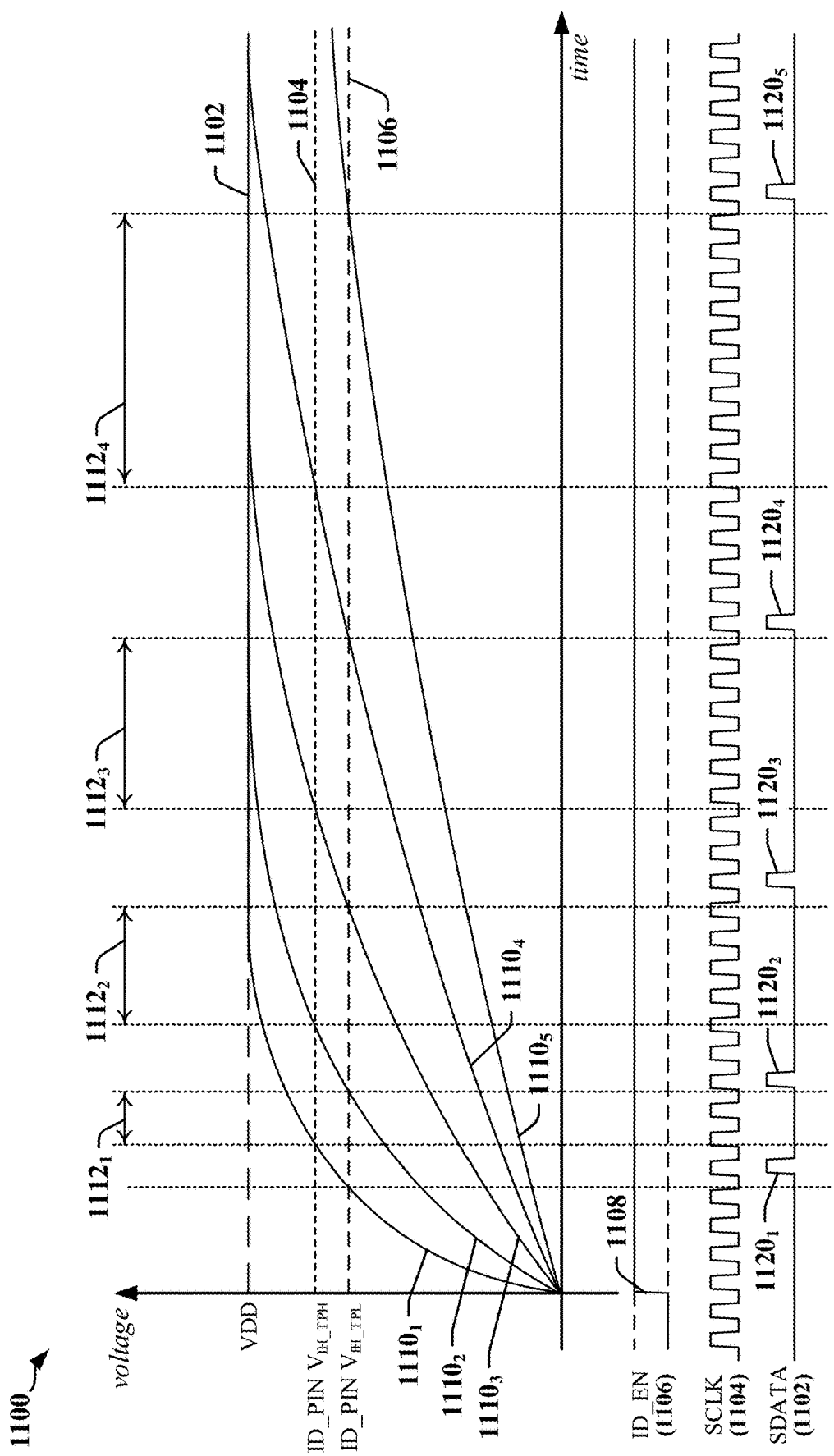
FIG. 11 is a timing diagram illustrating the operation of the address allocation circuit illustrated in FIG. 10.

With reference also to the timing diagram 1100 in FIG. 11, the BoM drives a clock signal on the SCLK line 1004 and releases the SDATA line 1002. In the illustrated example, the SDATA line 1002 is in a high-impedance state and held to a low signaling state when released by the BoM. The BoM starts the address allocation procedure by driving the ID enable line 1006 to a high signaling state thereby providing an edge 1108 on the ID enable line 1006. In the illustrated example, the edge 1108 is delayed in the response signals $810_1$-$810_5$ observed at the ID pins of 5 slave devices. For each slave device, a resistor 1008 and capacitor 1036 control the rate of transition of the delayed signal 1040 presented to a digital receiver circuit 1022. The digital receiver circuit 1022 may compare the voltage on the delayed signal 1040 to a reference voltage 1038. When the voltage on the delayed signal 1040 exceeds the reference voltage 103, the digital receiver circuit 1022 causes a detect signal 1042 at an output of the digital receiver circuit 1022 to transition high. The detect signal 1042 remains high until after the ID enable line 1006 returns to a low signaling state.

The detect signal 1042 is provided as an enable signal to a data receiver circuit 1030 coupled to the SDATA line 1002. The output of the data receiver circuit 1030 is provided as the clock input to a counter 1024. The counter 1024 is in a reset state when the ID enable line 1006 is driven to the high signaling state. In one example, the counter output 1044 is cleared in the reset state, such that all bits are at a low logic level. The illustrated counter 1024 provides a 5-bit counter output 1044. The counter output 1044 may have any number of bits, and the number of bits typically lies in the range of 4-8 bits. In one example, a controller of the slave device may reset the counter 1024. In some instances, the controller may reset the counter 1024 in response to a broadcast command or direct command received from the BoM.

The counter output 1044 is used to gate the detect signal 1042. The counter output 1044 is provided to a NOR gate 1026, which produces a gating signal 1046 that is in the high logic state when all bits of the counter output 1044 are at the low logic state, representing a zero count value. The gating signal 1046 is provided as an input to an AND gate 1028 that also receives the detect signal 1042 as an input. The AND gate 1028 provides a transmitter enable signal 1048 that is in the high logic state only when the detect signal 1042 is in the high logic state and the when all bits of the counter output 1044 are at the low logic state. The transmitter enable signal 1048 enables a line driver 1032 to drive the SDATA line 1002.

The input of the line driver 1032 is provided by a clock receiver circuit 1034. The line driver 1032 retransmits the clock signal received from the SCLK line 1004 on the SDATA line 1002. When the clock signal is initially high, or transitions high, the counter 1024 is clocked by the output of the data receiver circuit 1030, and the counter output 1044 changes to a non-zero value.

The non-zero value of the counter output 1044 causes the gating signal 1046 to be driven to the low logic level, causing the line driver 1032 to be disabled. The output of the line driver 1032 may enter a high-impedance state and the SDATA line 1002 may be pulled to the low signaling state by a pulldown resistor or the like. The address allocation circuit 1020 can drive a single pulse $1120_1$, $1120_2$, $1120_3$, $1120_4$ or $1120_5$ on the SDATA line 1002 before the counter output 1044 becomes non-zero. However, the data receiver circuit 1030 remains active during the address allocation procedure, and every pulse on the SDATA line 1002 clocks the counter 1024 and increases the counter output 1044.

Each slave device participating in the presently-disclosed address allocation procedure has a different RC constant, which may be obtained by providing different combinations of values for their resistor 1008 and/or capacitor 1036. In FIG. 11, example signals $1110_1$-$1110_5$ of the delayed signal 1040 are provided. The reference voltage 1038 used by the digital receiver circuit 1022 may be affected by PVT variations and may lie in a range defined by a maximum threshold voltage 1104 and a minimum threshold voltage 1106. The RC constant for each slave device is selected to provide guard-bands $1112_1$-$1112_5$ that ensure that each slave device generates its detect signal 1042 in response to the example signal $1110_1$-$1110_5$ transitioning through the range defined by the maximum threshold voltage 1104 and the minimum threshold voltage 1106. The RC constant for each slave device is further selected to ensure that the slave device has generated a pulse $1120_1$, $1120_2$, $1120_3$, $1120_4$ or $1120_5$ on the SDATA line 1002 before the next response signal begins to transition through the range defined by the maximum threshold voltage 1104 and the minimum threshold voltage 1106.

The BoM may terminate the address allocation procedure when the total number of pulses transmitted on the SDATA line 1002 corresponds to the total number of slave devices participating in the address allocation procedure. The BoM may terminate the address allocation procedure by driving the ID enable line 1006 to the low signaling state. Each slave device counts every pulse on the SDATA line 1002 after its detect signal 1042 has transitioned to the high logic state and before the ID enable line 1006 returns to the low signaling state. The slave device that generates the first pulse $1120_1$ on the SDATA line 1002 counts all of the pulses generated during the address allocation procedure. The slave device that generates the last pulse $1120_5$ on the SDATA line 1002 counts only the last pulse $1120_5$. After the address allocation procedure, each slave device has a different counter output 1044.

Figure 12:
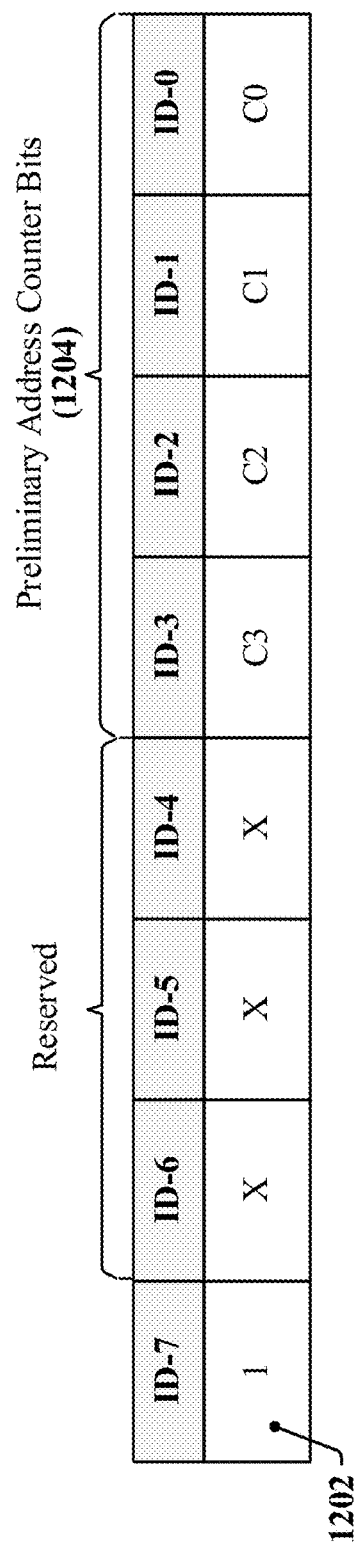
FIG. 12. Illustrates unique slave identifier generated using the address allocation circuit illustrated in FIG. 10.

In some implementations each slave device captures its respective counter output 1044 for use in creating a USID. In one example, each slave device captures its respective counter output 1044 and clears or resets its counter 1024 when its detect signal 1042 transitions to the low logic state. An example of a USID 1200 is provided in FIG. 12. In this example, the counter output 1044 in a slave device has 4 bits, and these bits are provided as ID bits {ID3-ID0} 1204. In this example, ID-7 1202 is set to '1', which may indicate that the USID 1200. A temporary USID may be updated by the BoM. The BoM may use protocol-defined or custom datagrams and/or commands to update the USID 1200. Counter outputs of any bit size can be implemented in the slave device, permitting more than 15 devices to be assigned a unique identifier.

An address allocation procedure provided in accordance with the present disclosure is ignored by legacy devices. The use of the ID enable line 1006 and appearance of pulses on the SDATA line 1002 is ignored by the slave devices when no protocol-specified start signaling has been provided.

Figure 13:
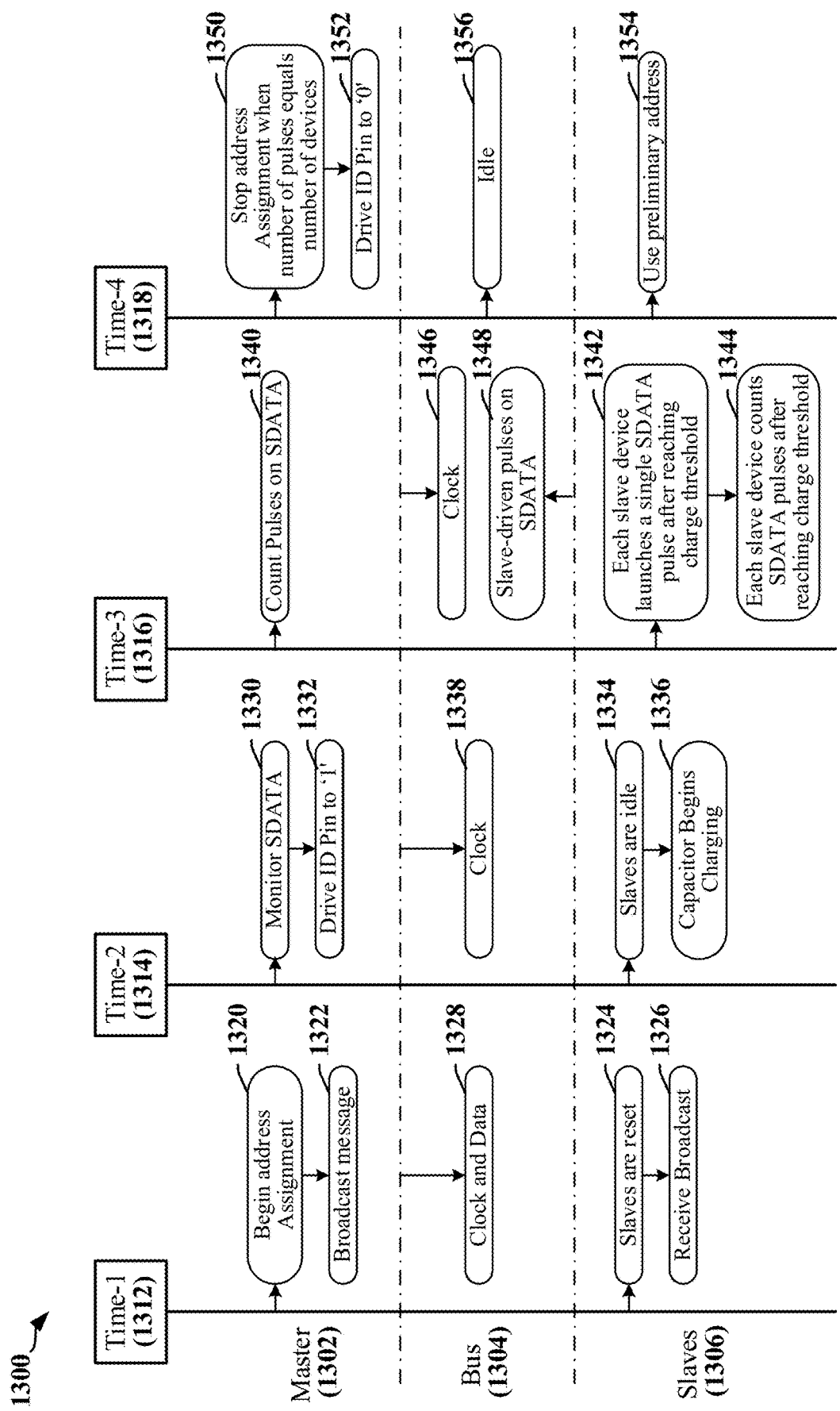
FIG. 13 is a state diagram illustrating certain aspects of the address allocation procedure provided in accordance with the present disclosure.

FIG. 13 is a diagram 1300 that illustrates aspects of the BoM state 1302, the serial bus state 1304 and the slave device state 1306 during various stages of an address allocation procedure provided in accordance with the present disclosure.

At a first point in time 1312, the BoM determines 1320 that an address allocation procedure is to be performed. The first point in time 1312 may correspond to a power-on reset, a BoM-initiated reset or an externally-initiated reset when the slave devices are reset 1324. In some instances, the address allocation procedure may be performed without a reset. The BoM may activate line drivers coupled to the SDATA line 1002 and SCLK line 1004 and may provide clock and data signals 1328 on the serial bus. The BoM may then broadcast a message 1322 indicating that the slave devices should monitor the ID enable line 1006 and participate in the address allocation procedure. The slave devices may receive the broadcast message 1326 and prepare for an address allocation procedure.

At a second point in time 1314, the BoM initiates the address allocation procedure. The BoM may release the SDATA line 1002, place a data line driver into high-impedance mode and begin monitoring 1330 the SDATA line 1002. The BoM continues to provide a clock signal 1338 on the SCLK line 1004. At this point, the slave devices are in an idle state 1334. The BoM then drives the ID enable line 1006 to the high signaling state 1332, causing the capacitors 1036 in the slave devices to begin charging 1336. The capacitors in the slave devices charge at different rates until, at a third point in time 1316, the capacitors reach a charge threshold and the slave devices launch a single pulse 1342 on the SDATA line 1002. The pulses are launched at different times, as determined by the rate of charging 1336 at each slave device. The BoM continues to drive the clock signal 1346 on the SCLK line 1004 while pulses generated by the slave devices are transmitted 1348 on the SDATA line 1002. The BoM counts the pulses 1340 generated by the slave devices. Each slave device counts pulses 1344 on the SDATA line 1002 after reaching charge threshold.

At a fourth point in time 1318, the BoM determines that all slave devices have launched a pulse on the SDATA line 1002, and the BoM terminate the address allocation procedure 1350 by driving the ID enable line 1006 to the low signaling state 1352. The BoM idles the serial bus 1356. The slave devices may construct a USID and/or use their respective counter values 1044 as USIDs 1354.

Examples of Processing Circuits and Methods

Figure 14:
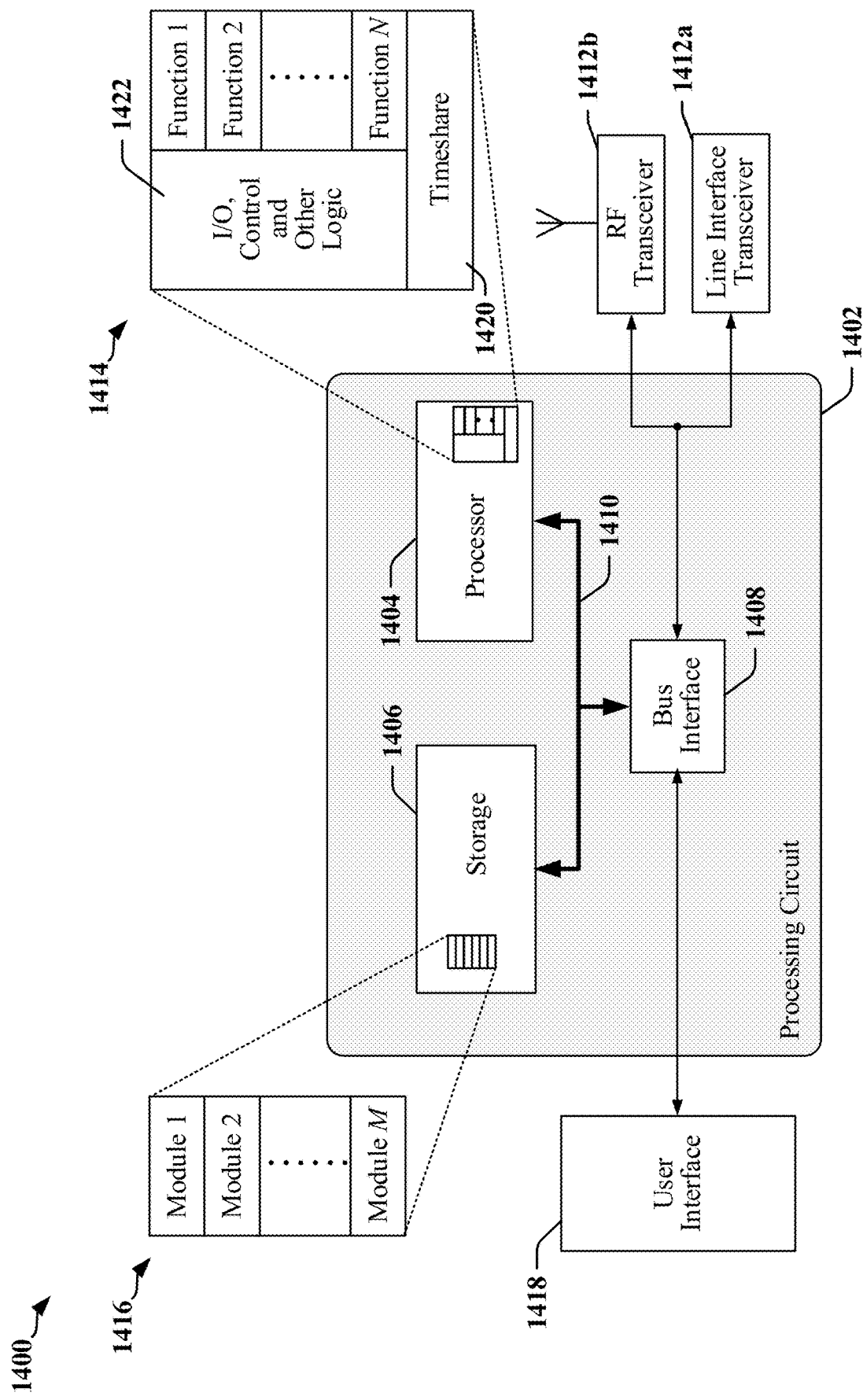
FIG. 14 illustrates one example of an apparatus employing a processing circuit that may be adapted according to certain aspects disclosed herein.

FIG. 14 is a diagram illustrating an example of a hardware implementation for an apparatus 1400. In some examples, the apparatus 1400 may perform one or more functions disclosed herein. In accordance with various aspects of the disclosure, an element, or any portion of an element, or any combination of elements as disclosed herein may be implemented using a processing circuit 1402. The processing circuit 1402 may include one or more processors 1404 that are controlled by some combination of hardware and software modules. Examples of processors 1404 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The bus 1410 may also link various other circuits such as timing sources, timers, peripherals, voltage regulators, and power management circuits. A bus interface 1408 may provide an interface between the bus 1410 and one or more transceivers 1412a, 1412b. A transceiver 1412a, 1412b may be provided for each networking technology supported by the processing circuit. In some instances, multiple networking technologies may share some or all of the circuitry or processing modules found in a transceiver 1412a, 1412b. Each transceiver 1412a, 1412b provides a means for communicating with various other apparatus over a transmission medium. In one example, a transceiver 1412a may be used to couple the apparatus 1400 to a multi-wire bus. In another example, a transceiver 1412b may be used to connect the apparatus 1400 to a radio access network. Depending upon the nature of the apparatus 1400, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer-readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. The computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as a transceiver 1412a, 1412b, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to a transceiver 1412a, 1412b, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412a, 1412b, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

FIG. 15 is a flowchart 1500 of a method that may be performed by a device coupled to a serial bus. In one example, the serial bus may be operated in accordance with an RFFE protocol. At block 1502, the device may delay transitions in a control signal received at an input pin of the slave device. At block 1504, the device may enable a counter after detecting a delayed first transition in the control signal. The counter may be configured to count pulses on a data line of a serial bus. At block 1506, the device may transmit a first pulse on the data line of the serial bus after enabling the counter. At block 1508, the device may count the first pulse and one or more additional pulses on the data line of the serial bus. At block 1510, the device may use an output of the counter to generate a unique identifier used for communicating over the serial bus. Each of a plurality of slave devices may be configured to transmit one of the one or more additional pulses on the serial bus after the first transition occurs in the control signal.

In certain examples, each of the plurality of slave devices is configured to add a different delay to the transitions in the control signal to obtain a version of the delayed first transition. Each of the plurality of slave devices may be configured to count pulses on the data line of the serial bus after detecting a respective version of the delayed first transition. Each of the plurality of slave devices counts a different number of pulses on the data line of the serial bus. Each of the plurality of slave devices may use an output of a corresponding counter to generate a unique identifier used for communicating over the serial bus.

In some implementations, the input pin of the slave device is coupled to a resistor-capacitor network that is configured to add a delay to the transitions in the control signal. The control signal may be provided by a bus master device or by a controller managed by a bus master device.

In one example, the slave device may refrain from transmitting more than one pulse on the data line of the serial bus after detecting the delayed first transition in the control signal. The first pulse may be generated from a clock signal received from the serial bus.

Figure 16:
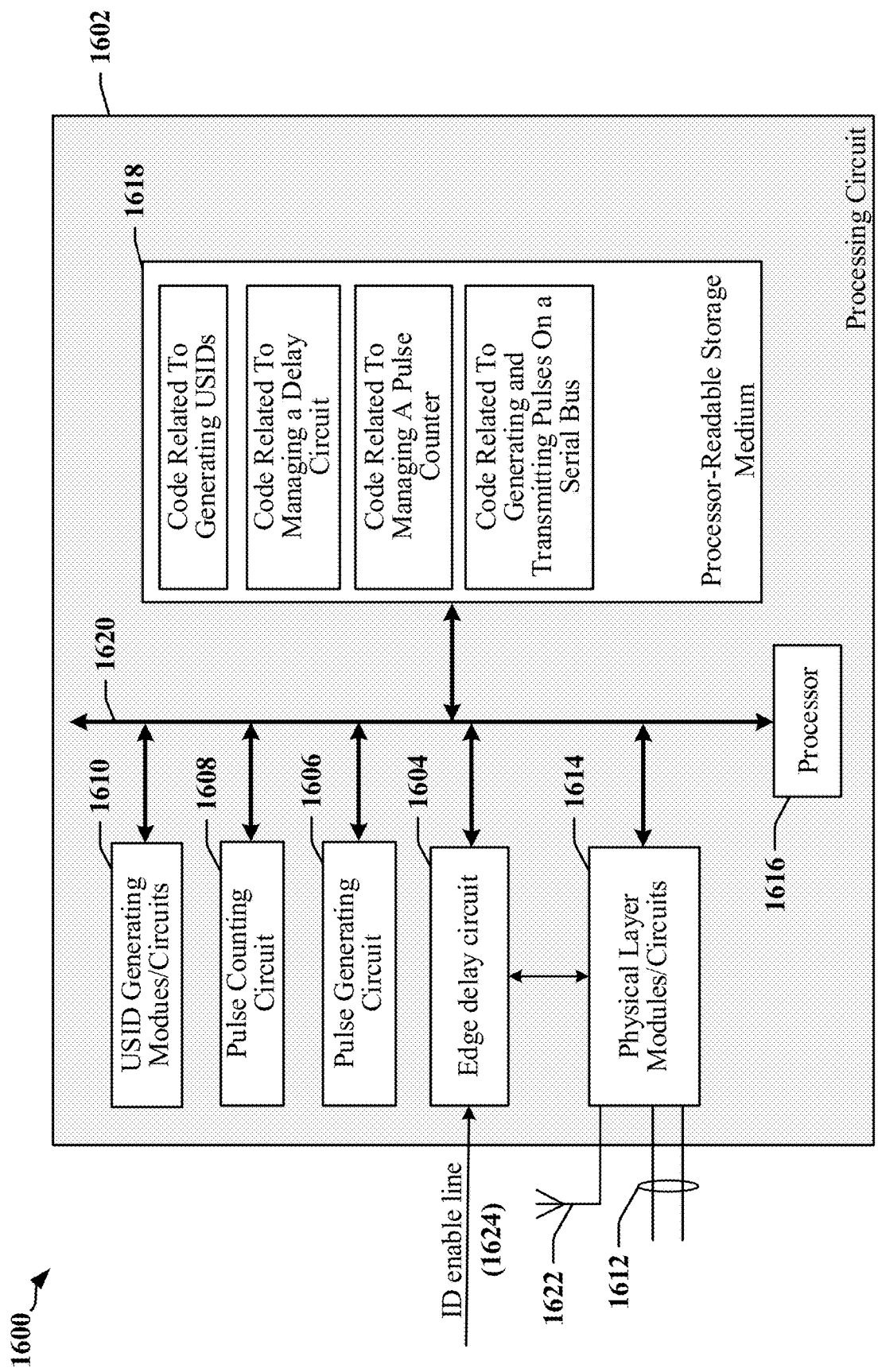
FIG. 16 illustrates an example of a hardware implementation for an apparatus adapted in accordance with certain aspects disclosed herein.

FIG. 16 is a diagram illustrating a simplified example of a hardware implementation for an apparatus 1600 employing a processing circuit 1602. The processing circuit typically has a controller or processor 1616 that may include one or more microprocessors, microcontrollers, digital signal processors, sequencers and/or state machines. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the controller or processor 1616, the modules or circuits 1604, 1606 and 1608 and the processor-readable storage medium 1618. One or more physical layer circuits and/or modules 1614 may be provided to support communication over a communication link implemented using a multi-wire bus 1612, through an antenna or antenna array 1622 (to a radio access network for example), and so on. The bus 1620 may also link various other circuits such as timing sources, peripherals, voltage regulators, and power management circuits, which are well known in the art, and therefore, will not be described any further.

The processor 1616 is responsible for general processing, including the execution of software, code and/or instructions stored on the processor-readable storage medium 1618. The processor-readable storage medium 1618 may include a non-transitory storage medium. The software, when executed by the processor 1616, causes the processing circuit 1602 to perform the various functions described supra for any particular apparatus. The processor-readable storage medium 1618 may be used for storing data that is manipulated by the processor 1616 when executing software. The processing circuit 1602 further includes at least one of the modules 1604, 1606 and 1608. The modules 1604, 1606 and 1608 may be software modules running in the processor 1616, resident/stored in the processor-readable storage medium 1618, one or more hardware modules coupled to the processor 1616, or some combination thereof. The modules 1604, 1606 and 1608 may include microcontroller instructions, state machine configuration parameters, or some combination thereof.

In one configuration, the multi-wire bus 1612 includes a serial bus configured to operate as an RFFE, SPMI or other serial bus, and the apparatus 1600 includes modules and/or circuits 1604 adapted to delay edges in a ID enable line 1624, modules and/or circuits 1606 adapted to generate and transmit pulses on the serial bus, modules and/or circuits 1608 adapted to count pulses observed on the serial bus, and modules and/or circuits 1610 adapted to generate a USID from a count of the pulses observed on the serial bus, where the USID is used for communicating over the serial bus.

In certain implementations, the apparatus 1600 includes physical layer circuits and/or modules 1614 that implement an interface circuit adapted to couple the apparatus 1600 to the multi-wire bus 1612. The apparatus 1600 may have one or more control circuits 1604, 1606, 1608 configured to delay transitions in a control signal received at an input pin of the slave device, enable a counter after detecting a delayed first transition in the control signal, where the counter is configured to count pulses on a data line of a serial bus, transmit a first pulse on the data line of the serial bus after enabling the counter, and count the first pulse and one or more additional pulses on the data line of the serial bus. The apparatus 1600 may have a processor configured to use an output of the counter to generate a unique identifier used for communicating over the serial bus. Each of a plurality of slave devices is configured to transmit one of the one or more additional pulses on the serial bus after the first transition occurs in the control signal.

In certain examples, each of the plurality of slave devices is configured to add a different delay to the transitions in the control signal to obtain a version of the delayed first transition. Each of the plurality of slave devices is configured to count pulses on the data line of the serial bus after detecting a respective version of the delayed first transition. Each of the plurality of slave devices counts a different number of pulses on the data line of the serial bus. Each of the plurality of slave devices uses an output of a corresponding counter to generate a unique identifier used for communicating over the serial bus.

In some implementations, the input pin of the slave device is coupled to a resistor-capacitor network that is configured to add a delay to the transitions in the control signal.

The control signal may be provided by a bus master device or is provided by a controller managed or operated by a bus master device.

The one or more control circuits 1604, 1606, 1608 may be configured to refrain from transmitting more than one pulse on the data line of the serial bus after detecting the delayed first transition in the control signal. The first pulse is generated from a clock signal received from the serial bus.

The processor-readable storage medium 1618 may include transitory or non-transitory storage devices configured to store code, instructions and/or parameters used to implement one or more methods or procedures disclosed herein. The processor-readable storage medium 1618 may include code for delaying transitions in a control signal received at an input pin of the slave device, enabling a counter after detecting a delayed first transition in the control signal, where the counter is configured to count pulses on a data line of a serial bus, transmitting a first pulse on the data line of the serial bus after enabling the counter, counting the first pulse and one or more additional pulses on the data line of the serial bus, and using an output of the counter to generate a unique identifier used for communicating over the serial bus. Each of a plurality of slave devices is configured to transmit one of the one or more additional pulses on the serial bus after the first transition occurs in the control signal.

In certain examples, of the plurality of slave devices is configured to add a different delay to the transitions in the control signal to obtain a version of the delayed first transition. Each of the plurality of slave devices is configured to count pulses on the data line of the serial bus after detecting a respective version of the delayed first transition. Each of the plurality of slave devices counts a different number of pulses on the data line of the serial bus. Each of the plurality of slave devices uses an output of a corresponding counter to generate a unique identifier used for communicating over the serial bus.

In some implementations, the input pin of the slave device is coupled to a resistor-capacitor network that is configured to add a delay to the transitions in the control signal. The control signal may be provided by a bus master device or by a controller managed by a bus master device.

In one example, the processor-readable storage medium 1618 includes code that causes the apparatus 1600 to refrain from transmitting more than one pulse on the data line of the serial bus after detecting the delayed first transition in the control signal. The first pulse is generated from a clock signal received from the serial bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communication at a slave device, comprising:
    delaying transitions in a control signal received at an input pin of the slave device;
    enabling a counter after detecting a delayed first transition in the control signal, wherein the counter is configured to count pulses on a data line of a serial bus;
    transmitting a first pulse on the data line of the serial bus after enabling the counter;
    counting the first pulse and one or more additional pulses on the data line of the serial bus; and
    using an output of the counter to generate a unique identifier used for communicating over the serial bus,
    wherein each of a plurality of slave devices is configured to transmit one of the one or more additional pulses on the serial bus after the first transition occurs in the control signal.

2. The method of claim 1, wherein each of the plurality of slave devices is configured to add a different delay to the transitions in the control signal to obtain a version of the delayed first transition.

3. The method of claim 2, wherein each of the plurality of slave devices is configured to count pulses on the data line of the serial bus after detecting a respective version of the delayed first transition.

4. The method of claim 1, wherein each of the plurality of slave devices counts a different number of pulses on the data line of the serial bus.

5. The method of claim 4, wherein each of the plurality of slave devices uses an output of a corresponding counter to generate a unique identifier used for communicating over the serial bus.

6. The method of claim 1, wherein the input pin of the slave device is coupled to a resistor-capacitor network that is configured to add a delay to the transitions in the control signal.

7. The method of claim 1, wherein the control signal is provided by a bus master device.

8. The method of claim 1, wherein the control signal is provided by a controller managed by a bus master device.

9. The method of claim 1, further comprising:
    refraining from transmitting more than one pulse on the data line of the serial bus after detecting the delayed first transition in the control signal.

10. The method of claim 1, wherein the first pulse is generated from a clock signal received from the serial bus.

11. An apparatus comprising:
    an interface circuit adapted to couple the apparatus to a serial bus;
    a control circuit configured to:
        delay transitions in a control signal received at an input pin of the apparatus;
        enable a counter after detecting a delayed first transition in the control signal; and
        transmit a first pulse on a data line of the serial bus after enabling the counter, wherein the counter is configured to count the first pulse and one or more additional pulses on the data line of the serial bus when enabled; and
    a processor configured to use an output of the counter to generate a unique identifier used for communicating over the serial bus, wherein each of a plurality of slave devices is configured to transmit one of the one or more additional pulses on the serial bus after the first transition occurs in the control signal.

12. The apparatus of claim 11, wherein each of the plurality of slave devices is configured to add a different delay to the transitions in the control signal to obtain a version of the delayed first transition.

13. The apparatus of claim 12, wherein each of the plurality of slave devices is configured to count pulses on the data line of the serial bus after detecting a respective version of the delayed first transition.

14. The apparatus of claim 11, wherein each of the plurality of slave devices counts a different number of pulses on the data line of the serial bus.

15. The apparatus of claim 14, wherein each of the plurality of slave devices uses an output of a corresponding counter to generate a unique identifier used for communicating over the serial bus.

16. The apparatus of claim 11, wherein the input pin of the apparatus is coupled to a resistor-capacitor network that is configured to add a delay to the transitions in the control signal.

17. The apparatus of claim 11, wherein the control signal is provided by a bus master device.

18. The apparatus of claim 11, wherein the control signal is provided by a controller managed by a bus master device.

19. The apparatus of claim 11, wherein the control circuit is further configured to:
refrain from transmitting more than one pulse on the data line of the serial bus after detecting the delayed first transition in the control signal.

20. The apparatus of claim 11, wherein the first pulse is generated from a clock signal received from the serial bus.

21. A non-transitory processor-readable storage medium comprising code for:
delaying transitions in a control signal received at an input pin of a slave device;
enabling a counter after detecting a delayed first transition in the control signal;
transmitting a first pulse on a data line of a serial bus after enabling the counter, wherein the counter is configured to count the first pulse and one or more additional pulses on the data line of the serial bus when enabled; and
using an output of the counter to generate a unique identifier used for communicating over the serial bus,
wherein each of a plurality of slave devices is configured to transmit one of the one or more additional pulses on the serial bus after the first transition occurs in the control signal.

22. The non-transitory processor-readable storage medium of claim 21, wherein each of the plurality of slave devices is configured to add a different delay to the transitions in the control signal to obtain a version of the delayed first transition, and wherein each of the plurality of slave devices is configured to count pulses on the data line of the serial bus after detecting a respective version of the delayed first transition.

23. The non-transitory processor-readable storage medium of claim 21,
wherein each of the plurality of slave devices counts a different number of pulses on the data line of the serial bus, and wherein each of the plurality of slave devices uses an output of a corresponding counter to generate a unique identifier used for communicating over the serial bus.

24. The non-transitory processor-readable storage medium of claim 21, wherein the input pin of the slave device is coupled to a resistor-capacitor network that is configured to add a delay to the transitions in the control signal.

25. The non-transitory processor-readable storage medium of claim 21, wherein the first pulse is generated from a clock signal received from the serial bus.

26. An apparatus comprising:
means for delaying transitions in a control signal received at an input pin of the apparatus;
means for counting pulses on a data line of a serial bus, including a counter that is enabled after a delayed first transition in the control signal is detected;
means for transmitting pulses on the data line of the serial bus, configured to transmit a first pulse on the data line of the serial bus after enabling the counter; and
means for generating a unique identifier, wherein the unique identifier is based on an output of the counter and is used for communicating over the serial bus,
wherein the counter is configured to count the first pulse and one or more additional pulses on the data line of the serial bus when enabled, and
wherein each of a plurality of slave devices is configured to transmit one of the one or more additional pulses on the serial bus after the first transition occurs in the control signal.

27. The apparatus of claim 26, wherein each of the plurality of slave devices is configured to add a different delay to the transitions in the control signal to obtain a version of the delayed first transition.

28. The apparatus of claim 26, wherein the input pin of the apparatus is coupled to a resistor-capacitor network that is configured to add a delay to the transitions in the control signal.

29. The apparatus of claim 26, wherein the control signal is provided by a bus master device or a controller managed by the bus master device.

30. The apparatus of claim 26, wherein the means for transmitting pulses on the data line of the serial bus is further configured to:
refrain from transmitting more than one pulse on the data line of the serial bus after detecting the delayed first transition in the control signal.

* * * * *